United States Patent [19]

Banschick

[11] Patent Number: 5,683,762
[45] Date of Patent: *Nov. 4, 1997

[54] CENTERPIECE ASSEMBLY SIMULATING FLORAL ARRANGEMENT

[76] Inventor: Kenneth A. Banschick, 30 Maple Dr., Great Neck, N.Y. 11021

[*] Notice: The portion of the term of this patent subsequent to Aug. 7, 2012, has been disclaimed.

[21] Appl. No.: 211,606

[22] PCT Filed: Aug. 6, 1993

[86] PCT No.: PCT/US93/07411

§ 371 Date: Apr. 7, 1994

§ 102(e) Date: Apr. 7, 1994

[87] PCT Pub. No.: WO94/03669

PCT Pub. Date: Feb. 17, 1994

Related U.S. Application Data

[63] Continuation-in-part of Ser. No. 925,770, Aug. 7, 1992, Pat. No. 5,244,700.

[51] Int. Cl.⁶ ........................................... B32B 9/00
[52] U.S. Cl. ................... 428/4; 428/23; 428/24; 47/41.12; 47/41.13; 47/41.14; 211/13.1
[58] Field of Search ........................... 428/4, 23, 24; 47/41.12, 41.13; 211/13

[56] References Cited

U.S. PATENT DOCUMENTS

| | | | |
|---|---|---|---|
| 781,414 | 1/1905 | Garnsey | 47/41.13 |
| 903,227 | 11/1908 | Pruden | 47/41.13 |
| 2,686,989 | 8/1954 | Dillon et al. | 47/41.13 |
| 3,431,041 | 3/1969 | Fontlladosa | 428/34.4 |
| 3,768,202 | 10/1973 | Wheelock | 47/41.13 |
| 4,461,118 | 7/1984 | Fertig | 428/23 |
| 5,244,700 | 9/1993 | Banschick | 428/4 |

*Primary Examiner*—Patrick Ryan
*Assistant Examiner*—Abraham Bahta
*Attorney, Agent, or Firm*—Mitchell A. Stein

[57] ABSTRACT

A container including an elongated hollow member having two ends, an axis, a maximum width and an aperture and being adapted to contain objects; a decorative element being axially attached to one of the ends of the elongated hollow member and having a maximum width greater that the maximum width of the elongated hollow member; a pom-pom-like portion included in the decorative element, this portion having segments that radiate in substantially three dimensions to substantially fill a central region; an attachment system for the pom-pom-like portion for axially attaching the pom-pom-like portion to the elongated hollow member; and an openable cover adapted to obscure the aperture and to substantially contain the objects in the elongated hollow member. Also, a plurality of different containers and arrangements thereof in bouquets, fans, frontals, laterals, cascades, conicals, fountains and other geometries.

29 Claims, 13 Drawing Sheets

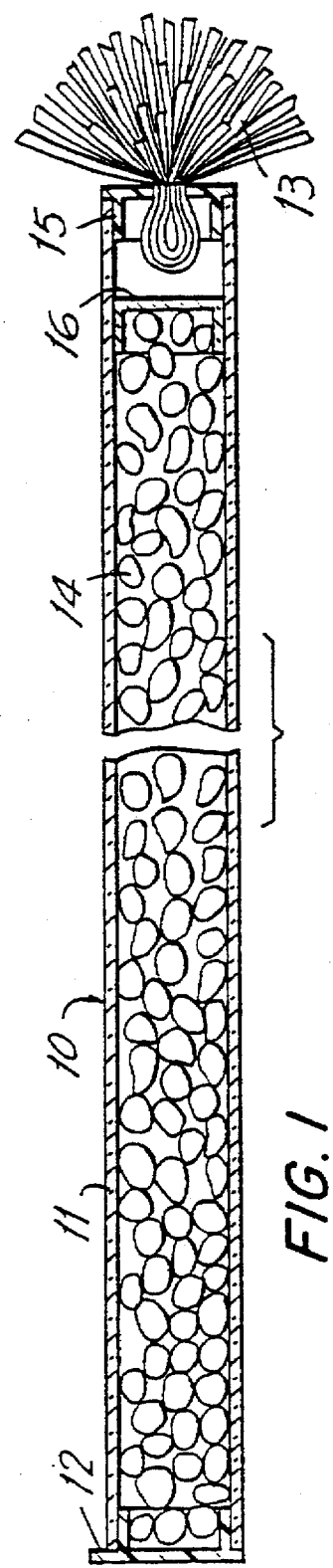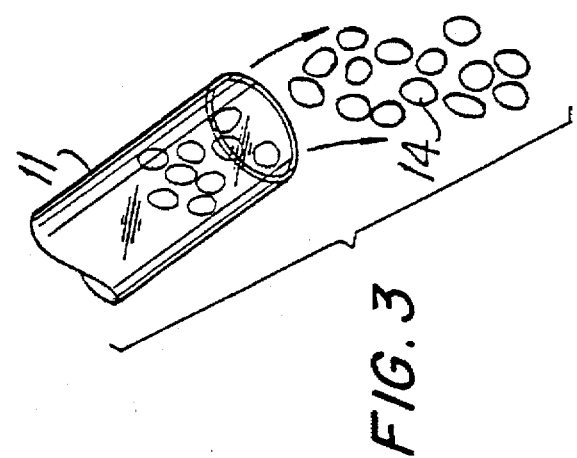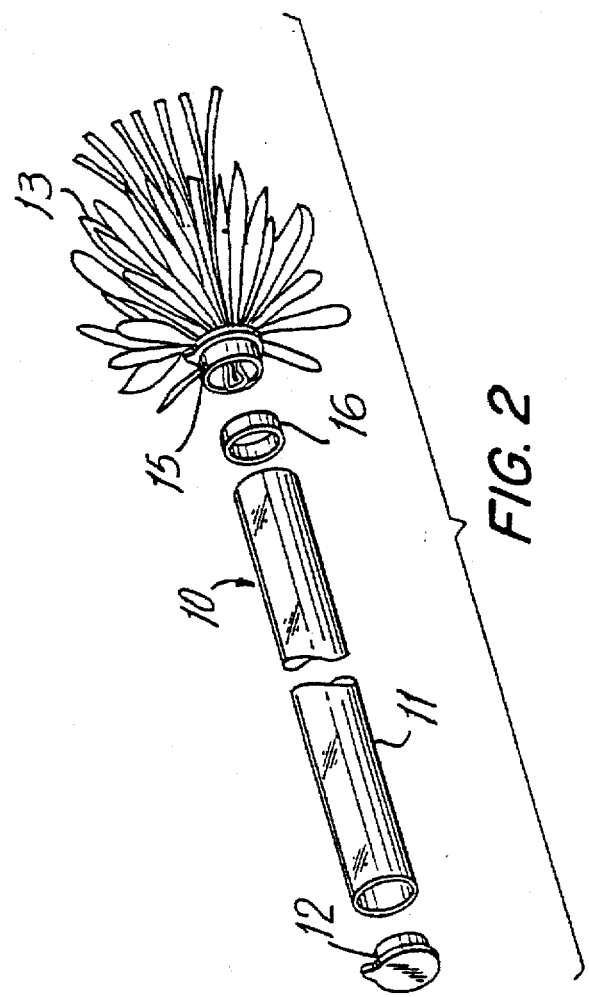

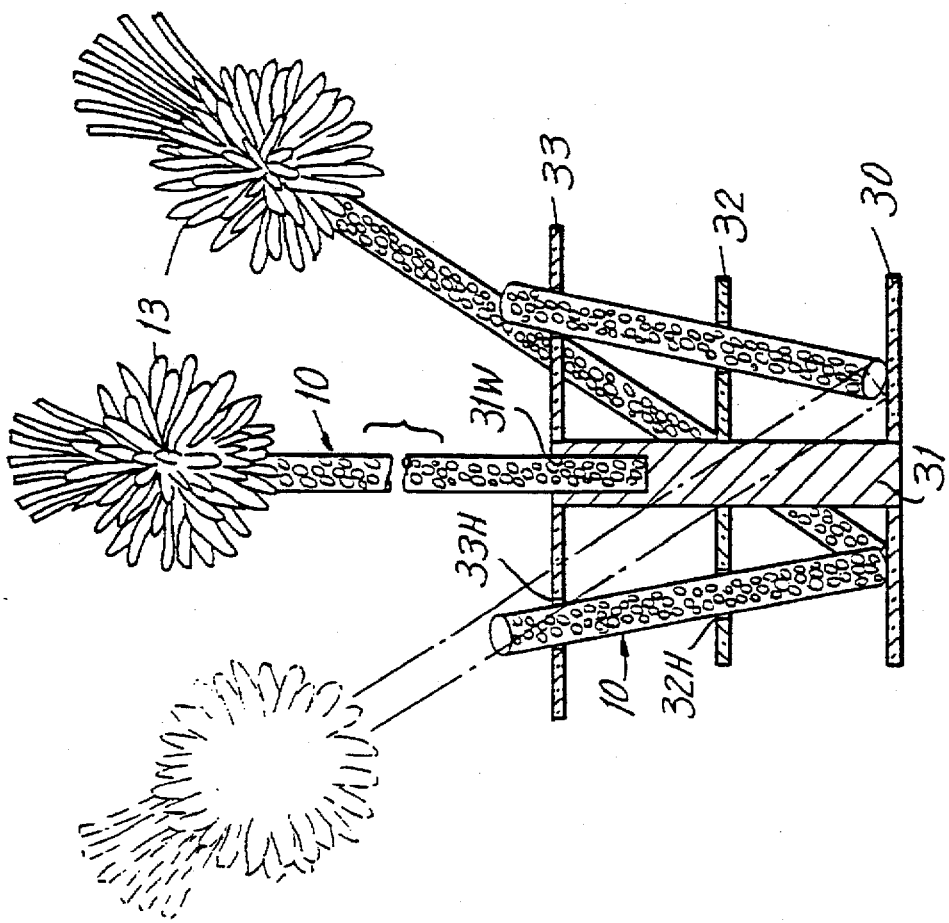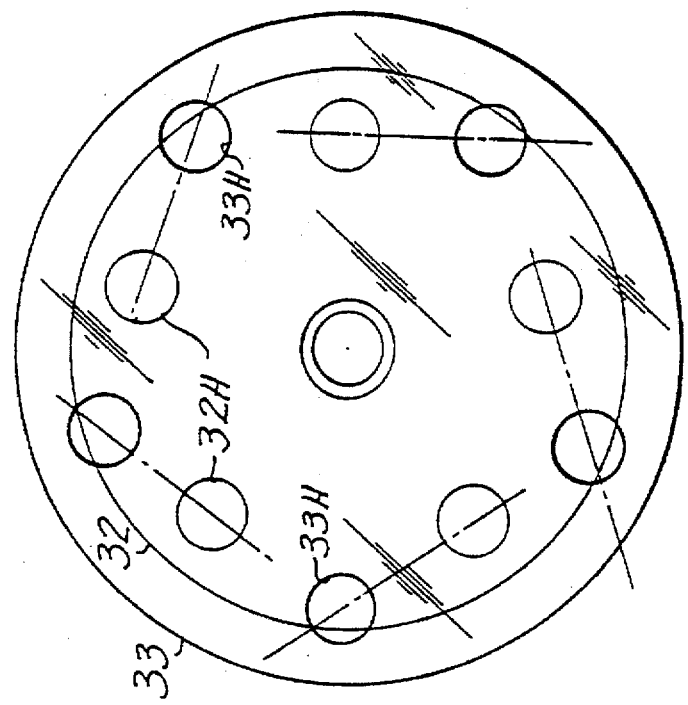

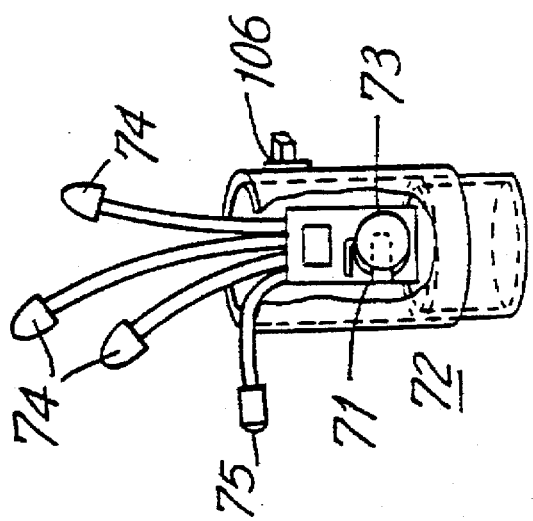
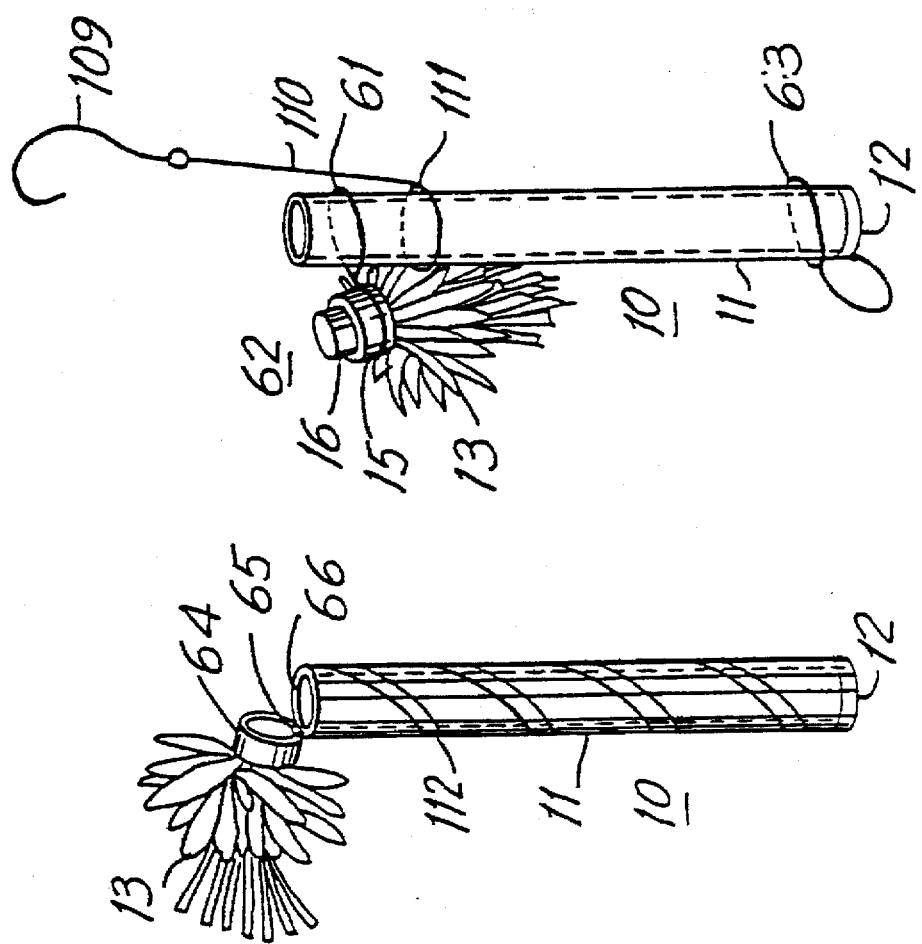

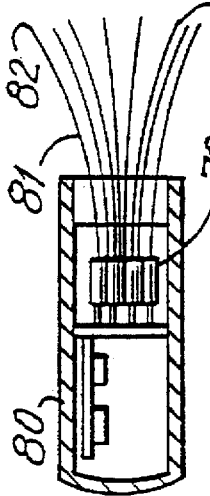
FIG. 23
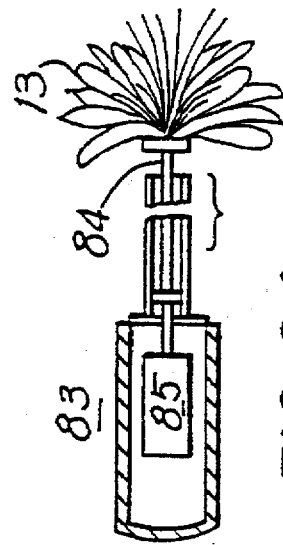
FIG. 24
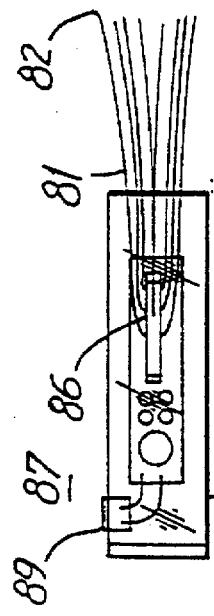
FIG. 25
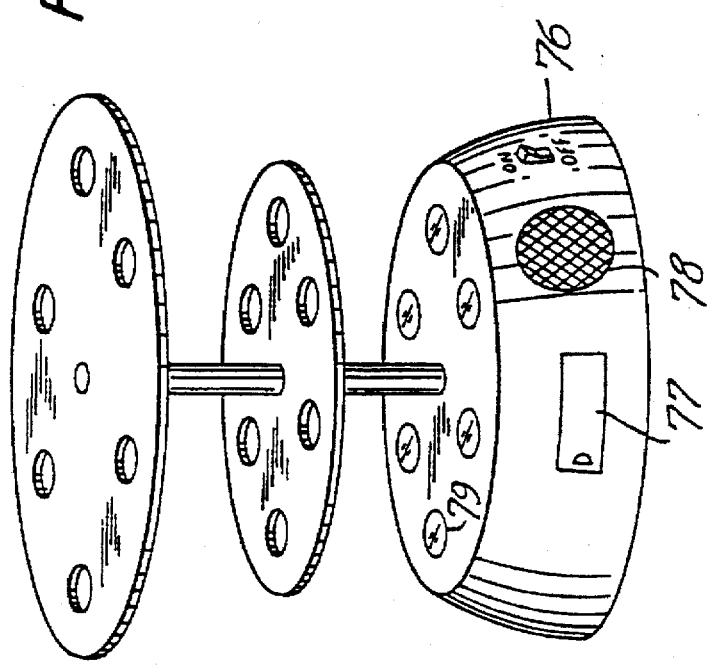
FIG. 22
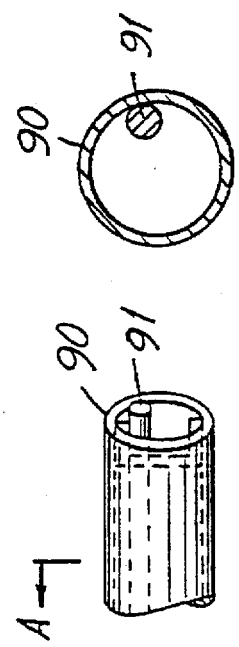
FIG. 26
FIG. 27

CENTERPIECE ASSEMBLY SIMULATING FLORAL ARRANGEMENT

CONTINUING DATA

This application is a continuation-in-part of U.S. patent application Ser. No. 925,770 filed on Aug. 7, 1992 which issued on Sep. 14, 1993 as U.S. Pat. No. 5,244,700.

BACKGROUND OF THE INVENTION

1. Field of Invention

The specification and claims of that application are expressly incorporated herein by reference.

This invention relates generally to decorative containers, display or presentation racks, stands or bases therefore, and a shipping system. The decorative containers are preferably used as table centerpieces, and more particularly as a part of or an entire centerpiece assembly which simulates a bouquet arrangement of cut flowers. The bouquet effect of the preferred embodiment is achieved by providing a plurality of floral-like elements whose stem is formed by a tubular wand or stem filled with pellets of edible candy and crowned with a flower-like pom-pom.

2. Status of Prior Art

On festive occasions, such as an engagement, wedding, Bar Mitzvah, confirmation or birthday party, it is often the practice to adorn each table where the guests gather with a centerpiece in the form of a vase or bowl containing a bouquet of cut flowers. Such centerpieces are usually distributed to the quests as a memento of this occasion. The flowers are normally distributed to only a single guest because of inherent transport limitations, e.g., that cut flowers require a vase with water. Distribution is further limited in that there is but one centerpiece typically provided per table, and also because the beauty of flowers is enhanced by their arrangement into a bouquet. Thus, if a host desires that each guest receive a party favor, a separate gift must be provided.

When the festive occasion is a birthday party for a child and many other guests are children, the tables are usually laden with candy. At the conclusion of the party, each person in attendance is given a small bag of candy as a parting gift, especially since children typically attach little value to flowers. Thus, in this case, flowers are inappropriate as a party favor, although they might still be provided as a centerpiece.

To entertain young guests at a child's party or on other festive occasions, a host may engage for this purpose a professional magician who performs feats of magic, such as card tricks, illusions, and making a live rabbit disappear from sight. A particular tool of magicians is a wand, which the magician waves to invoke "mysterious" forces while executing the magical feat. Wands have been associated with the supernatural since time immemorial, and their shape evokes particular meaning. Thus fairies, good or bad, are often shown carrying wands, and even the magic flute, whose sounds are reputed to have magical powers, is a wand-like instrument. Therefore, the wand-like shape, when also serving as a hollow elongated member to form a container or receptacle, serves the dual purpose of holding items which may be removed, as well as evoking a certain aesthetic and magical mystique.

A preferred embodiment of the present invention thus takes into account not only the decorative function of a floral centerpiece for festive occasion, but also the role of candy and wands on such occasions.

U.S. Pat. No. 1,491,926 to Rosenwald discloses a support for a bunch of cut a flowers in the form of a vase having installed therein, one above the other, two grids adapted to receive the stems of the cut flowers so as to hold these flowers at different angles.

The flower arranging vase shown in the U.S. Pat. No. 4,461,118 to Ferting serves a similar purpose. A vase is provided with a perforated wall, the perforations being provided so that the stems of the flowers inserted in these apertures extend outwardly from the side of the vase, while the stems of the flowers received in the mouth of the vase stand more or less upright.

U.S. Pat. No. 877,145 to Waddell discloses a cut flower holder having a weighted base above which are supported at different levels two apertured plates to receive the stems of the cut flowers.

U.S. Pat. No. 1,468,743 to Porter shows a candy package in the form of a plant growing in a flower pot. The bulk of the candies are contained in the pot, the others being supported above the pot to represent blossoms.

U.S. Pat. No. 4,957,784 to Ripamonti discloses a decorative bow and a method of manufacture therefore.

The vase-like display container for candy shown in U.S. Pat. No. 3,431,041 to Fontlladosa has an apertured, dome-shaped cover in whose holes are inserted the stems of lollipops, thereby creating a bouquet of lollipops.

SUMMARY OF INVENTION

It is an object of the present invention to provide a container which includes an elongated hollow member having two ends, an axis, a maximum width and an aperture and being adapted to contain objects; a decorative element being axially attached to one of the ends of the elongated hollow member and having a maximum width greater that the maximum width of the elongated hollow member; a pom-pom-like portion included in the decorative element, this portion having segments that radiate in substantially three dimensions to substantially fill a central region; an attachment system for the pom-pom-like portion for axially attaching the pom-pom-like portion to the elongated hollow member; and an openable cover adapted to obscure the aperture and to substantially contain the objects in the elongated hollow member.

It is a further object of the present invention to provide a plurality of different containers and arrangements thereof in bouquets, fans, frontals, laterals, cascades, conicals, fountains and other geometries.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a longitudinal section through a container in accordance with a preferred embodiment of the invention;

FIG. 2 is an exploded view of the container with the pom-pom like portion in accordance with preferred embodiment of FIG. 1;

FIG. 3 is a pictorial side view showing candy pellets as the contained objects being dispersed from the container through the aperture, in accordance with the preferred embodiment of FIG. 1;

FIG. 10 is a sectional side view of the rack shown in FIG. 9 with containers containing objects situated therein;

FIG. 11 is a top view of the rack shown in FIG. 9;

FIG. 19 is a side perspective view of a hinged container;

FIG. 20 is a side perspective view of a container having tethered covers and a suspension system;

FIG. 21 is a side perspective view of an embodiment of an electronic module;

FIG. 22 is a side perspective view of a rack containing an electronic module;

FIG. 23 is a cutaway side view of an electronic module illuminating fiber optics;

FIG. 24 is a cutaway side view of an electro-mechanical module;

FIG. 25 is a side view of an electronic module including a flash lamp and fiber optics;

FIG. 26 is a cross-sectional view taken along section A—A shown in FIG. 27 and including a light pipe;

FIG. 27 is a side perspective view of an elongated hollow member including a light pipe;

DETAILED DESCRIPTION OF THE PREFERRED EMBODIMENTS

Figure 5:
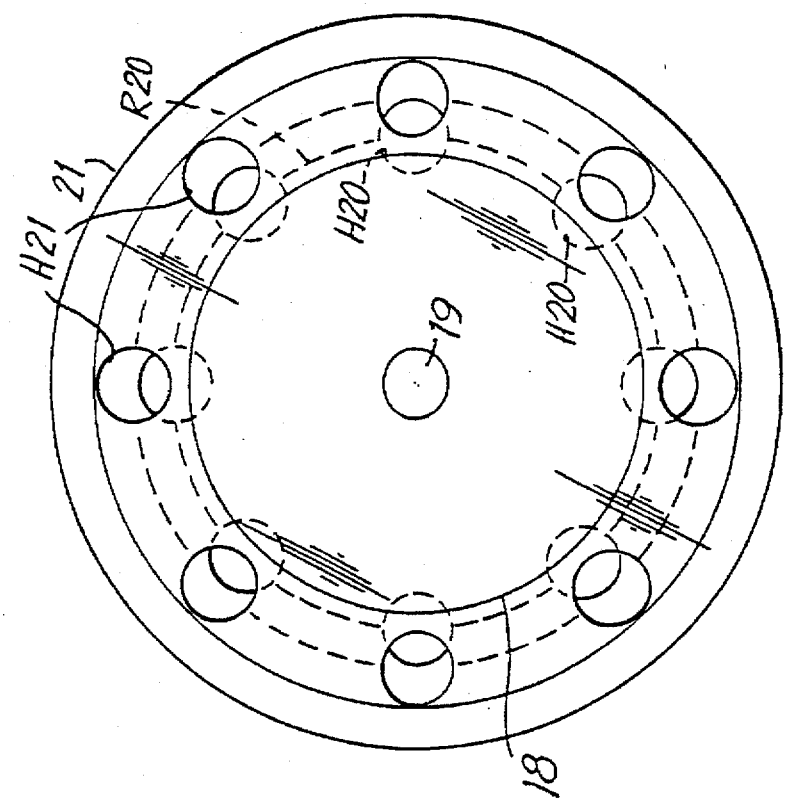
FIG. 5 is a top-view perspective of the rack shown in FIG. 4.

The decorative end closure preferably comprises a pom-pom, and more preferably a pom-pom having floral characteristics. The floral pom-pom provides an aesthetic similarity to a cut flower when attached to a hollow elongated member, and when a plurality of decorative containers arranged together provides an aesthetic substitute for a floral bouquet or centerpiece. Pom-pom decorative elements may also invoke other aesthetic significance.

In an apparatus with a floral-like decorative end closure, the hollow elongated element functions as the stem element. In other arrangements, the hollow elongated element may be considered a wand. Because of the container nature of the hollow elongated element, various contents may be inserted in this portion. In a preferred embodiment, the hollow elongated element is a transparent tube which is filled with edible foodstuffs. In a more preferred embodiment, the hollow elongated element is a container filled with colored candies.

The present invention provides a centerpiece assembly having a base or stand, providing an arrangement of individual elements, which simulate an array of cut flowers, each element including a supply of edible candy or other goods contained in a hollow elongated member, the elongated hollow member simulating the stem, which may be formed by a tubular wand of transparent material filled with candy pellets whose color imparts color to the stem.

The preferred arrangement of the decorative containers according to the present invention comprises a plurality of like containers supported at a single level by a rack, each container being outwardly tilted from a central axis to form a conical formation with the apex down. There may be a plurality of levels of so-supported decorative containers within a single rack.

The present invention also provides a decorative container comprising a hollow elongated member having an aperture and an enclosed space for holding contents and a decorative end closure, said decorative end closure preferably forming a pom-pom structure and more preferably having floral characteristics. The decorative container may advantageously also comprise an additional decorative element or a novelty device. Exemplary novelty devices include electronic modules, electro-optic modules, electromechanical modules, electroacoustic modules, acoustic modules, radio frequency or optical signal transceiving (transmitting and/or receiving) modules, piezoelectric modules, volatile composition dispersing modules, cosmetics, pyrotechnic modules, pneumatic or hydraulic modules. These modules may be included within the decorative container or external to it. In a preferred embodiment, a single module may be incorporated in the base or stand and provide a novelty function or suite of functionality for a plurality of decorative containers.

The decorative container may also be associated with a module which provides a function other than a novelty function. In this instance, the function may be related to function as a centerpiece, or to another function.

It is also an object of the present invention to provide a stand or base providing an arrangement or array of hollow elongated elements. The stand or base provides stability and a three dimensional presentation of the elements. The stand or base may also be used to maintain or assist in maintaining the integrity and arrangement of the elements during transport.

The stand or base may also include various functional modules, as described above. A module in the base unit may advantageously interact with a module in the decorative container to provide a distributed functionality. In this instance, the base unit may also advantageously interact with other proximate base units. This interaction may advantageously form the basis of a party game, wherein the individual player element may be the individual or the table, competing against other individuals or tables.

A preferred embodiment of the present invention provides that each floral element is a self-contained package for a supply of edible candy, and these elements may therefore be distributed as parting gifts to the guests attending a party in which the centerpiece assembly is placed on a table about which the guests gather.

The present invention also provides a centerpiece assembly in which an array of floral elements is supported by a rack so that these elements are clustered in a conical formation to assume the configuration of a bouquet.

The centerpiece assembly preferably includes an array of floral-like elements, supported and arranged on a rack to simulate a bouquet of cut flowers. Each element in the array has a stem formed by a transparent tubular wand filled with pellets of candy whose color imparts color to the stem. The lower end of the stem is provided with a removable stopper, the upper end having a decorative flower-like pom-pom attached thereto.

A preferable rack according to the present invention is preferably fabricated of transparent material or a material which matches or contrasts the supported elements, and is composed of a base plate having a center post anchored thereon on which are supported at lease two tier plates, one above the other, each having a ring of equispaced holes therein coaxial with the center post. In other embodiments, a post may be eccentric or there may be a plurality of posts at each level; the supports may also be tubular or sheet-like. The upper tier ring has a diameter greater than that of the lower tier ring, whereby each hole in the upper ring is spaced a greater distance from the post than the corresponding hole in the lower ring.

The stem of each floral-like element is inserted into a respective hole an upper ring and the corresponding hole in a lower ring, with its lower end resting on the base, whereby the elements of array are outwardly inclined and converge at the base to simulate a bouquet of cut flowers. Of course, a single tier ring could be used to support the bouquet, with the ends of the stems resting on a table, the outward force of the inclined elements balancing the forces of the other elements to maintain a stable configuration. Other configurations are also possible. The present invention also provides a decorative container which is designed for use in the direct or outer packiging for cosmetics. In such an application, the decorative end closure may advantageously be employed as an applicator, either by virtue of the decorative element itself serving as a brush or the like, or the decorative end closure being associated with the applicator or the like. The decorative container may also provide a feedback device, e.g. a mirror, fragrance detector, skin hydration tester, color balance meter, reflectivity meter, etc., to assist the user in applying or using the cosmetic.

The preferred pom-pom according to the present invention comprises a roughly spherical or spherical section having protruding edges or points rather than surfaces, said edges or points having a visual projection to a central origin, and which face substantially outward. Because the distal edges or points may be traced toward the center, they provide dimensionality and volume, rather than an external surface or series of surfaces which obscure visibility of a low density central region.

A pom-poms according to the present invention includes elements that are sufficiently delicate in structure so as to require their protection during shipping. In these cases the pom-poms can be assembled onto a shipping tray, preferably made of corrugated cardboard, plastic or other structurally protective material. The tray can be prefabricated such that holes, spaces or receptacles areas are spaced far enough apart to keep the pom-poms from injuring each other during rough shipment. In one example, a corrugated tray, holding twelve pom poms, is used to assemble the pom-poms. The pom-poms are held in place by clips, pins, or friction insertion of the bottom of the pom-pom into the tray receptacles areas. These trays can then be placed in shipping containers side by side, whereupon, the decorative containers such as tubes can be placed side by side to create a layer or layers of tubes matching the pom poms in the trays.

Some shipping configurations call for three, four or more of these trays to be placed, side by side, or one on top of another or other configuration to optimize shipping and transport costs.

In another configuration, a tray, matching tubes, and a display rack are fitted to create a ready-to-assemble arrangement.

Another preferred pom-pom according to the present invention is a spherical or hemisperical shaped decorative object formed from a plurality of elements, each preferably having a similar shape or form, or having two different shapes or forms, each having a distal edge. point or projection, each element projecting outward toward a perimeter to form an indefinite edge of the object as a whole. The elements comprising the object preferably has a length which is greater than its girth.

The decorative end closure may also comprise a proportionately sized Koosh ball (TM), which is a plurality of rubber strands emanating from a central core.

A further type of preferred pom-pom comprises an open frame architechture consisting of a plurality of relatively dense filamentous structures separated in space by air, each of said filaments projecting from a central portion in a generally outward direction, to form a pom-pom having a substantially spherical shape.

The most preferable floral pom-pom decorative end closure of the present invention is preferably fabricated from a synthetic plastic film material such as polyester or polypropylene, and may have a vapor-deposited film of aluminum, amber colored or other metallic coatings imparting color and reflectivity to the plastic film. The material used for forming the pom-pom may also be paper, which may be, for example tissue paper, fringed or, rolled. Alternative materials also include tulle or other fabric, or laminates of metal foil and plastic film. The pom-pom may also include fiber optic elements, electronic elements (e.g. LEDs or incandescent bulbs), latex or rubber filaments (e.g. Koosh ball), or other materials.

For particular applications, the pom-pom may be formed from soap leaves or shavings.

In order to simulate various natural or distinctive objects such as flowers, the pom-pom may have a color scheme and spatial arrangement adapted to achieve a particular aesthetic value. A preferred type of pom-pom has a substantially spherical or a spherical section shape, having a tuft of ribbon material axially emerging from the center.

The pom-pom itself may preferably be composed of a plurality of filaments protruding from a common central source. The filaments may be tufts, cords, ribbons, creased layers of material, leaves, enfoldments, rods or wires. An essential characteristic of the pom-pom is that it has a three dimensional arrangement of flexible elements projecting from a central source, creating an aesthetic dimensionality.

Another type of spheric decorative structure comprises an paper accordion structure, in which the paper folds form open spaces which can be traced centrally to an axis of symmetry. Such structures may be affixed to elongated members. Accordion paper structures may be used to form or decorate the centerpiece rack or stand. These paper structures may be collapsed in order to facilitate shipping. Variations of the shape of the accordion may be obtained by adapting the die cutting process to provide various features, such as floral protrusions.

A kit for assembling a decorative display may be advantageously obtained by together providing a stand, adapted after assembly to hold a plurality of members; a plurality of hollow members preferably having a diameter of between approximately 0.75 to 2 inches and preferably having a length of approximately 3 to 18 inches preferably formed of butyrate plastic tubing, a removable closure for each hollow elongated member, and a pom-pom with floral characteristics and subassemblies thereof with a means for attachment to the hollow elongated member. Alternatively, the tube may be blind at one end and the pom-pom attached to a removeable closure.

A kit for assembling the decorative conatiners according to the present invention may advantageously be obtained by together providing a hollow member, preferably having a diameter of between approximately 0.75 to 2 inches and preferably having a length of approximately 3 to 18 inches preferably formed of butyrate plastic tubing, a removable closure and a pom-pom with floral characteristics and subassemblies thereof with a means for attachment to the hollow elongated member. Alternatively, the tube may be blind at one end and the pom-pom attached to a removeable closure. Contents for the tube may optionally be provided.

END CLOSURES FOR DECORATIVE CONTAINERS

The hollow elongated member of the present invention may be sealed in a number of ways. The end of the hollow elongated member may be inherently blind, or closed by means of a closure. The closure may be an end cap or plug which is inserted into or affixed around an aperture of the hollow elongated member. The distal end may also be closed by means of a cap which fits outside the hollow elongated member. The distal end closure may also comprise a pair of concentric wall elements and a perpendicular wall, which fits both inside and outside the wall of the hollow elongated member. The end cap or plug may be of a friction fit type, sealed with adhesive, ultrasonically sealed, heat sealed, or mechanically sealed. Further, the end cap or plug may be a screw type or bayonet type closure. The distal closure may be either the primary access port for the contents of the container, or may be secondary.

The distal end of the hollow elongated member may also be heat sealed with an flush end foil membrane, which in turn may be open or covered with a secondary covering as described above. The foil membrane is removed by peeling the foil away from the aperture or puncturing the membrane.

The decorative end closure may generally employ similar sealing methods to those described for the distal closure. However, the decorative end closure is relatively fragile, and therefore if it is the primary means for accessing the contents of the container, then the sealing method should be such that a relatively low amount of force is necessary in order to remove the decorative end closure. Thus, the decorative end closure should be a friction fit, screw or bayonet type closure, if it is the primary access port.

CENTERPIECE ASSEMBLY OF FLORAL-LIKE ELEMENTS

In the various embodiments of a centerpiece assembly in accordance with the present invention, as shown in FIGS. 4, 6, 8, and 10, an arrangement of containers, each being a floral-like element, each generally designated by reference numeral 10, is supported on a transparent rack to create the effect of a bouquet of flowers whose configuration or arrangement depends on the structure of the supporting rack.

Each floral-like element 10, as shown in FIGS. 1, 2 and 3, includes a stem formed by an elongated hollow member, being a tubular member 11 which is preferably formed of transparent, rigid, synthetic plastic material, such as an acrylic polymer, polypropylene or PVC, and may resemble a wand. Received in the lower end of tubular member 11 is an openable cover, the removable stopper 12.

Attached to the upper end of floral-like element 10 and enclosing this end is a pom-pom-like structure, pom-pom 13 which simulates a highly decorative flower. Pom-pom 13, which crowns the stem of floral-like element 10, is preferably fabricated of synthetic, plastic film material, such as polyester, polypropylene or polystyrene optionally having vapor-deposited thereon aluminum, amber-colored or other metallic coatings imparting color to the plastic film. The material used for forming the pom-pom may also be paper, tulle or other fabric, or laminates of metal foil and plastic film.

In order to simulate a flower, the pom-pom 13 may be composed of a round puff having a single distinctive color, such as violet, yellow or rose, from which puff emerges at its center a cluster of multi-colored ribbons.

Filling a hollow space in the elongated tubular member 11 are objects contained therein, in this instance being a pile or accumulation of colored pellets 14 of edible candy whose sizes such as to be accommodated within tubular member 11, the diameter of which in this embodiment is preferably no greater than about one inch. In other embodiments, larger wands may be advantageously be used. These candy pellets 14 may be constituted by loose, colored jelly beans, Hershey chocolate kisses wrapped in metal foil, presenting a silver, gold or other metallic color, or M&M chocolate pieces having outer coatings in various colors. Pom-pom 13 is anchored so that its root enters a main cap 15 which encloses the upper end of the wand. An inner cap 16 is also provided to shield the root of the pom-pom 13 from the candy pellets 14. Together, the main cap 15 and the inner cap 16 may comprise an openable cover or be fixed.

Thus when tubular member 11 is filled with a pile of jelly beans, the pile way be created by successive sections of beans in different colors, so that the lowermost section is formed by green colored beans, the section thereabove by yellow-colored beans, followed by a section of pink colored beans, and so on. In this way, the pile presents a series of contrasting colors. However, when the pile is created by kisses in a silver-like foil wrappers, then the entire pile is silvery.

It should be apparent that the contents of the tubular member 11 is not limited to colored candy pellets 14 or even confections, and may also include other foodstuffs, gifts, merchandise, samples, novelties, as may be inserted into the tubular member 11. While in a preferred embodiment, the tubular member 11 is transparent, in other embodiments, the stem may be colored, and formed of a transparent, translucent or opaque material. It is further noted that the tubular member 11 may be a composite structure, having varying optical properties over its surface. The tubular member 11 may also contain secondary containers, e.g. cosmetics or liquids, which may be removed through the closure, which in the present example is the removable stopper 12.

In an embodiment in which the tubular member 11 is transparent, the resultant stem formed and filled with the candy pellets 14 has a color or colors imparted thereto by the candy pellets 14. In practice, the stem may be color-coordinated with the flower simulating pom-pom 13. One can also provide an array of floral-like elements 10, the stems of which are in the respective colors of a rainbow and thereby create a highly dramatic and multicolored bouquet.

In order to fill the tubular member 11, removable stopper 12 is removed therefrom, and when the removable stopper 12 is returned to the tubular member 11, the candy pellets 14 are entrapped in the tubular member 11 of the floral-like element 10 which becomes a candy package.

FIRST EMBODIMENT OF THE CENTERPIECE ASSEMBLY

Figure 4:
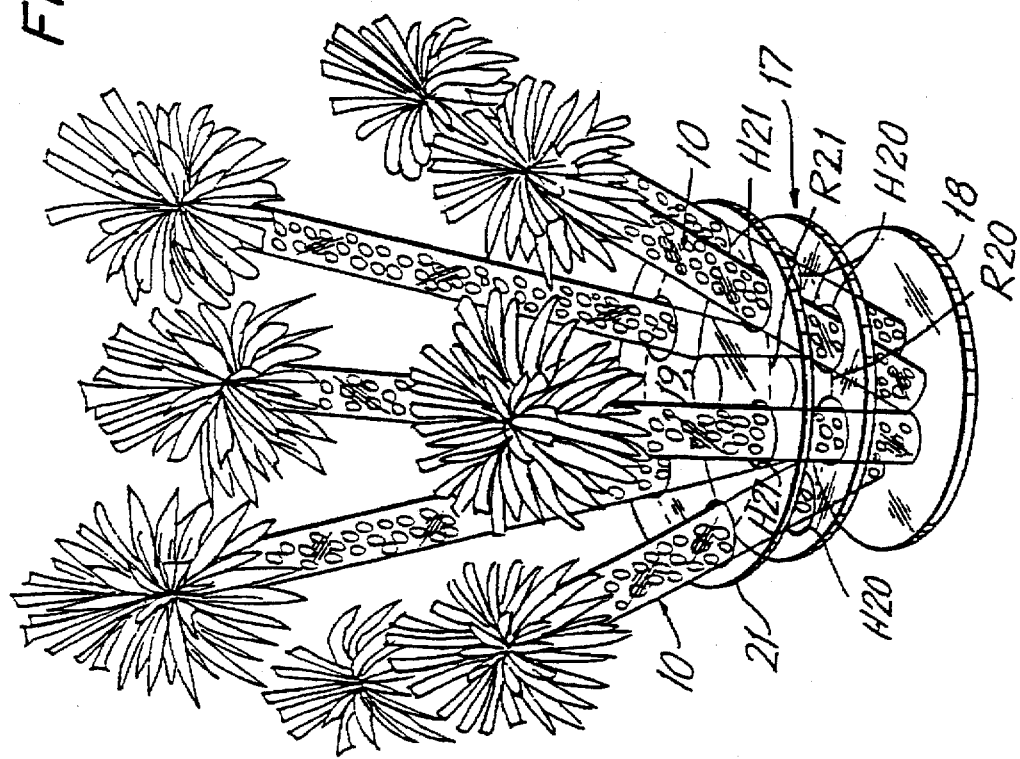
FIG. 4 is a perspective view of one embodiment of a centerpiece assembly according to the invention, in which a group of containers, in this instance comprising a plurality of containers comprising floral-like elements which are together supported in a bouquet arrangement on a rack-like support structure.

As shown in FIGS. 4 and 5, in one preferred embodiment of the centerpiece assembly, the assembly is constituted by an array of floral-like elements 10, supported in a bouquet arrangement by a rack, generally designated by reference numeral 17.

Rack 17, which is fabricated of transparent and synthetic plastic material of high strength, such as an acrylic polymer or PVC, includes a circular base plate 18. Anchored on base plate 18 is a vertical center post 19 supported at equispaced or quasi-equispaced levels above the base plate circular tier plates 20 and 21.

The first tier plate 20, whose diameter is greater than that of base plate 18, is provided with a circular ring R20 of equispaced holes H20, the ring R20 being coaxial with center post 19 and concentric with the periphery of tier plate 20. The second tier plate 21, whose diameter is greater than that of tier plate 20, is provided with a circular ring R21 of equispaced holes H21, equal in number to the number of the holes in ring R19. Ring R21, whose diameter is greater than that of ring R20, is coaxial with center post 19 and concentric with the periphery of tier plate 21. Hence the distance from each hole H21 in ring R21 from center post 19, is greater than the distance of the corresponding hole H20 in ring R20 from center post 19. In order for a stem to go through hole H21 into a corresponding hole H20, it must assume an angle relative to the vertical plane.

In other embodiments, the symmetry is not necessary, and the arangement may be eccentric or staggered.

For arrangement into a bouquet, floral-like elements 10, equal in number to the number of holes in each ring, have their stems inserted in holes H21 and H20 in rings R21 and R20 of the tier plates so that the ends of the stems rest on base plate 18. Because of the difference in the diameters of these hole rings, the ends of the stems are clustered on base plate 18, the stems being outwardly inclined relative to the base plate to create a conical array of floral-like elements. Of course, an excess number of holes may be provided in each ring so that the number of floral-like elements may be varied according to the number of guests.

SECOND EMBODIMENT OF THE CENTERPIECE

In the first embodiment of the centerpiece assembly shown in FIGS. 4 and 5, the array of outwardly inclined, flower-like elements 10 are so held by rack 17 as to create a single conical bouquet formation.

Figure 6:
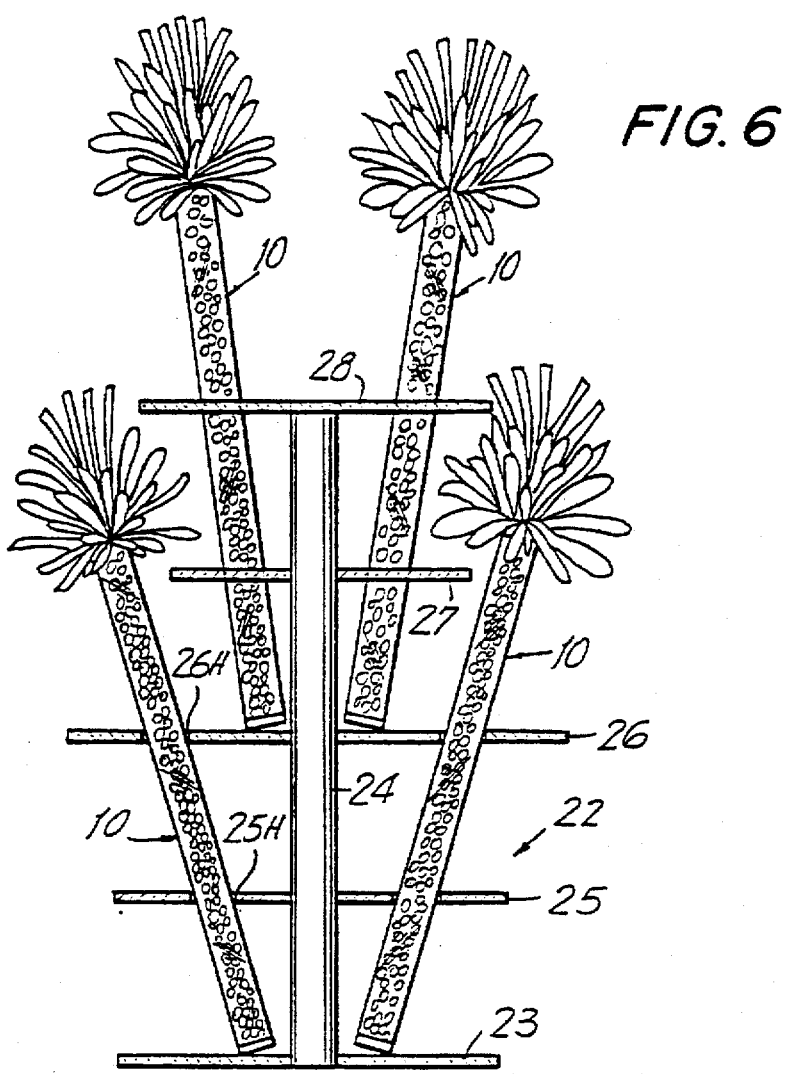
FIG. 6 is a sectional side view of another embodiment of a rack with containers configured in a manner to function as a centerpiece assembly, in which the rack is adapted to support two intermeshed bouquet arrangements of floral-like elements.
Figure 7:
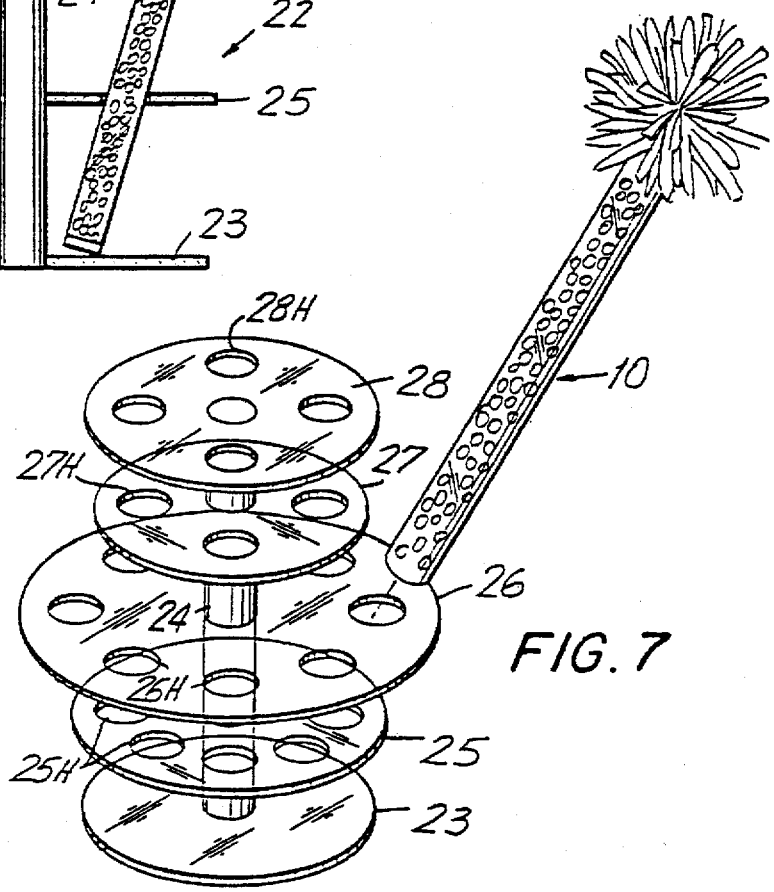
FIG. 7 is a perspective top view of the rack shown in FIG. 6.

In the second embodiment shown in FIGS. 6 and 7, the rack for the centerpiece assembly, generally designated by numeral 22, is constricted so as to create two a two-level bouquet in which a higher cluster of flower-like elements 10 forming an upper bouquet is partially nested within a lower cluster of elements to create a more complex floral arrangement.

Rack 22 comprises a circular base 23 on which a center post 24 is anchored to support at equispaced or quasi-equispaced positions above circular base 23 tier plates 25, 26, 27 and 28, each having a ring of holes therein, 25H, 26H, 27H, and 28H respectively. The diameter of second tier plate 26 is greater than that of first tier plate 25. The arrangements of holes 25H and 26H is such that, as shown in FIG. 6, the ends of floral-like elements 10 which go through these holes rest on circular base 23 to form a conical cluster.

The diameter of the third tier plate 27 is smaller than tha of the second tier plate 26, the arrangements of holes 27H and 28H being such that the ends of floral-like element 10 which go through these holes, as shown in FIG. 6, rest on tier plate 26 about center post 24 and within the circular ring of holes 26H on this tier plate. In this way, the upper floral element bouquet cluster of elements, which partially nest within the lower flowal element bouquet cluster to rest on the second tier plate 26 which acts as a base with respect to the upper floral element cluster bouquet.

THIRD EMBODIMENT OF CENTERPIECE

In the first two embodiments of centerpiece assemblies in which floral-like elements are supported in a bouquet arrangement formation on a rack, the location of the holes in the tier plates is such that each floral-like element 10 which goes through an upper tier hole is outwardly inclined relative to the center post of the rack and lies in a vertical plane that passes through the vertical axis of the center post.

In a third embodiment of the centerpiece assembly, as shown in FIGS. 8, 9, 10 and 11, the rack, generally designated by numeral 29, is composed of a circular base 30 on which are supported a first tier plate 32 whose diameter is smaller than that of the circular base 30 and a second tier plate 33 whose diameter is somewhat greater than that of circular base 30.

The first tier plate 32 is provided with a ring of five equispaced holes 32H, while the second tier plate 33 is also provided with an equal number of, e.g. five, ring holes 33H. Both rings of holes are spaced the same radial distance from the center post 31. However, the holes 32H in first tier plate 32 are angularly displaced with respect to the corresponding holes 33H in second tier plate 33. In other words, an axis defined by a hole 32H and 33H is not parallel to a central axis of the rack 29, the central axis being normal to the surfaces of the tier plates 32, 33, which in turn are substantially parallel to the support for the rack.

Figure 8:
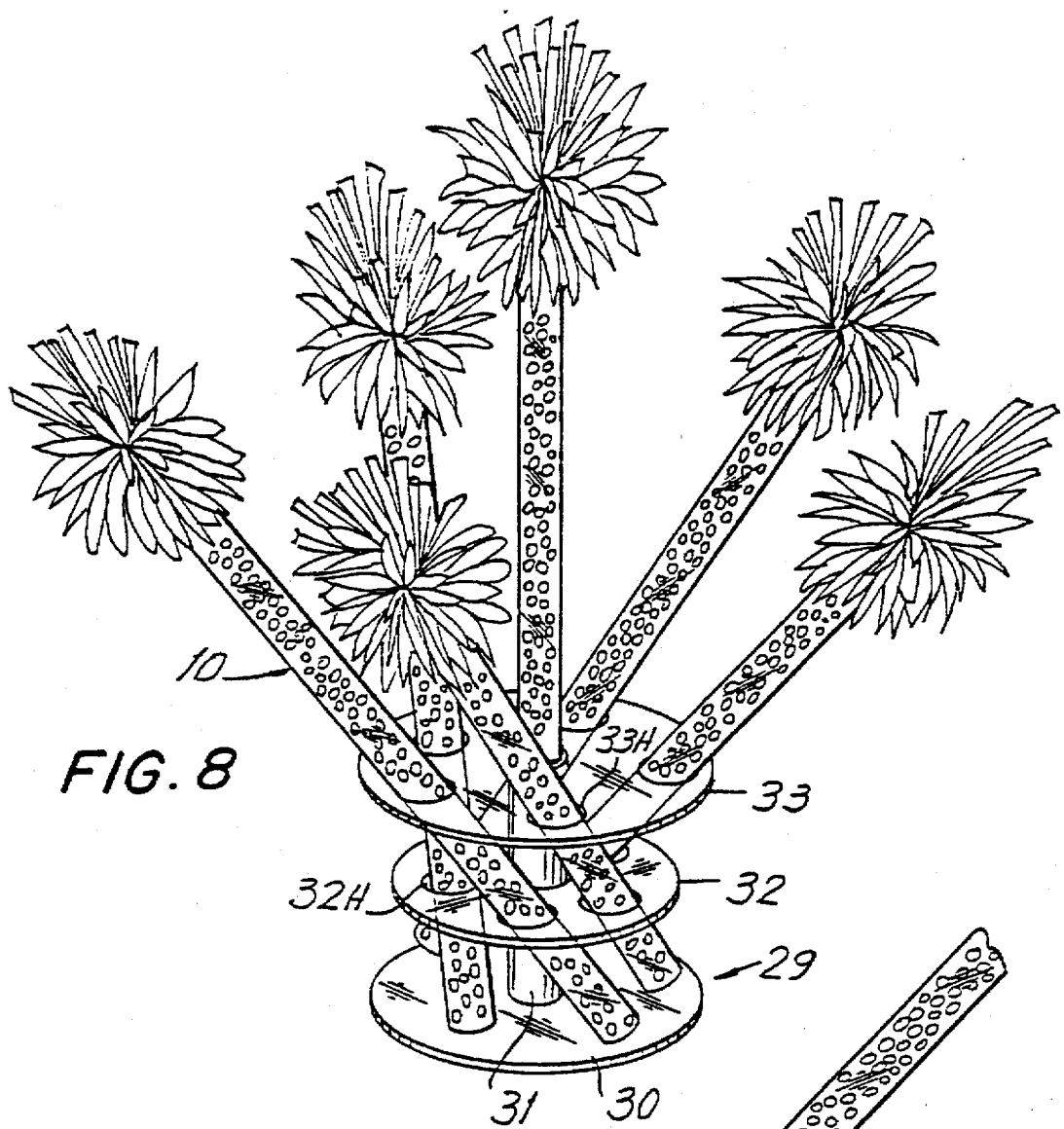
FIG. 8 is a perspective top view of yet another embodiment of a functioning centerpiece assembly.
Figure 9:
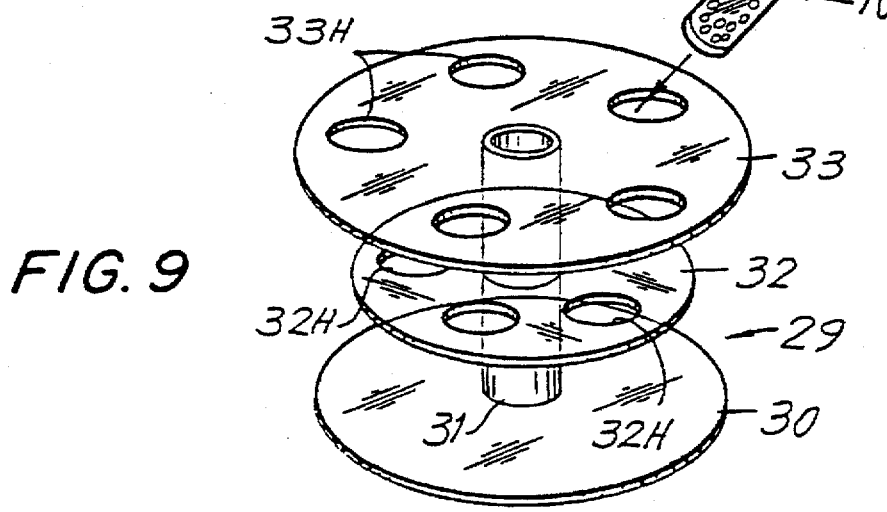
FIG. 9 is a perspective top view of the rack shown in FIG. 8.

Hence, as shown in FIGS. 8 and 10, when floral-like elements 10 are inserted through a corresponding set of ring holes 33H and 32H to rest on circular base 30, floral-like elements 10 are then angled with respect to center post 31.

Center post 31, as shown in FIG. 10, is provided at its upper end with a cylindrical well 31W into which is inserted the lower end of a floral-like element 10 so that this element which is at the center of the bouquet arrangement is upright. Alternatively, a different decorative structure may be placed at the apex of the rack 29.

FOURTH EMBODIMENT OF THE CENTERPIECE

Figure 12:
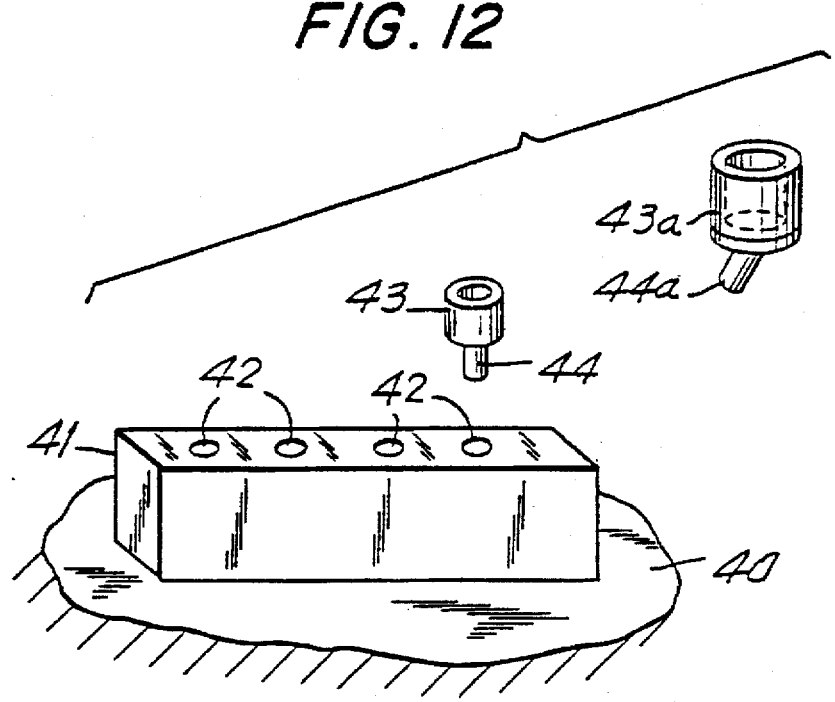
FIG. 12 is a side perspective view of a rack and two alternatively embodied, insertable container supports.

In a fourth embodiment according to the present invention, a rack for presenting wand elements is provided in which the direction and/or location of the individual wands may be varied according to the tastes of the decorator, as shown in FIG. 12. The rack comprises a base unit which is placed on a flat surface 40 for support. The base 41, or an element associated with the base has a plurality of cavities 42 into which a cup 43 having a lower protrusion 44 adapted to mate the cavity may be placed. This base 41 element has a large number of cavities 42 so that various optional placements of the cups 43 are possible. Therefore, the designer has control over the location of each floral-like element 10 on the base 41 element. If the lower protrusion 44a from the cup 43a is not axially aligned with the cup structure, then the designer also has the ability to select an angle of the cup 43a, thus changing the direction of the floral-like element 10.

Figure 13:
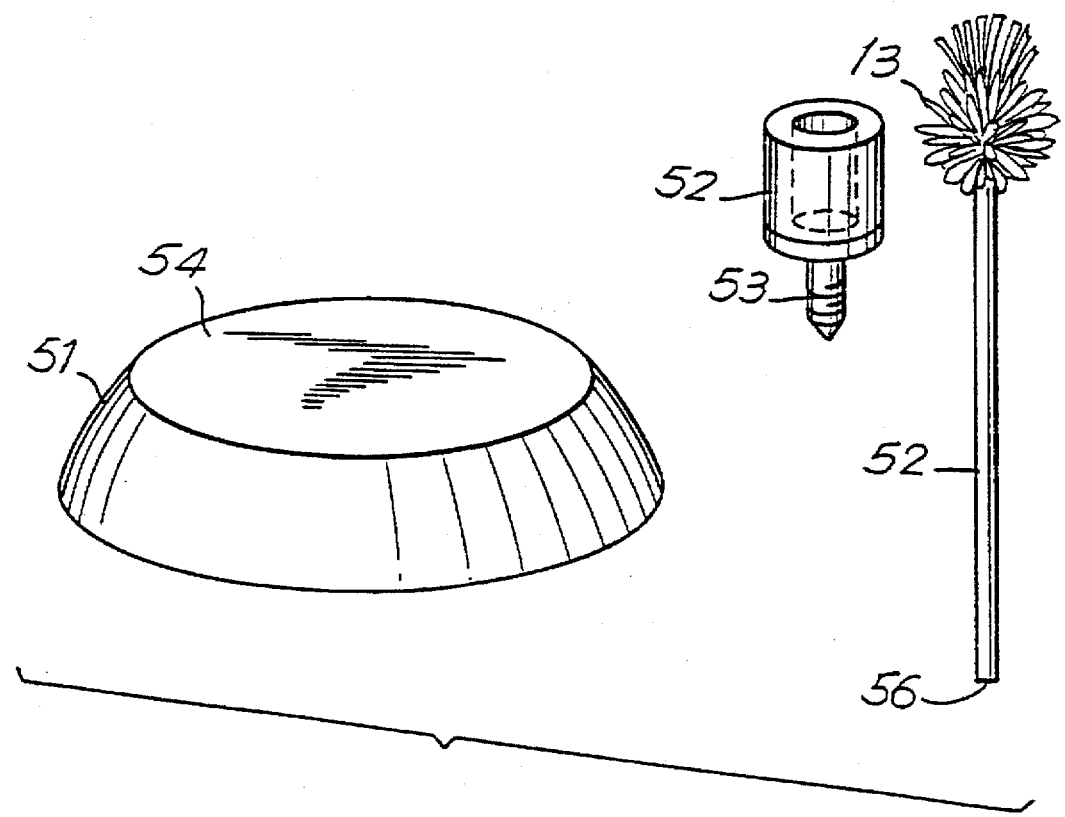
FIG. 13 is a perspective side view of yet another rack adapted to be able to accept at least one insertable container support or other decorative objects.

In another embodiment, as shown in FIG. 13, the base 51 is formed of styrofoam or other low density synthetic foam polymer, or wood, and a cup 52 which has an axially aligned screw 53 or dowel, which may be firmly implanted in the styrofoam at any desired angle or location, preferably on an upper surface 54 therof.

A further embodiment of the present invention comprises a styrofoam base 51 which supports a plurality of elongated members 55 which may be plastic tubing or rod, e.g. cylinders, each bearing a symmetric pom-pom 13 having floral features. The lower end 56 of the elongated member may be forcefully inserted in the styrofoam base 51 in order to form an arrangement.

Figure 14:
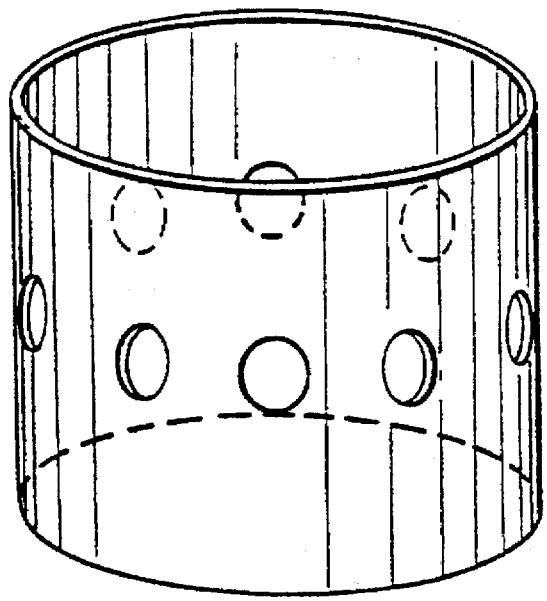
FIG. 14 is a side perspective view of an apertured cylinder rack.
Figure 15:
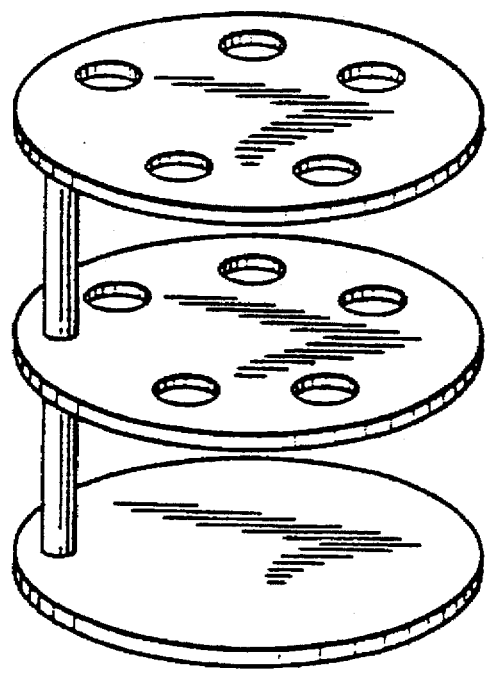
FIG. 15 is a side perspective view of a rack having an eccentric, cyclindrical support for a plurality of tier plates.
Figure 16:
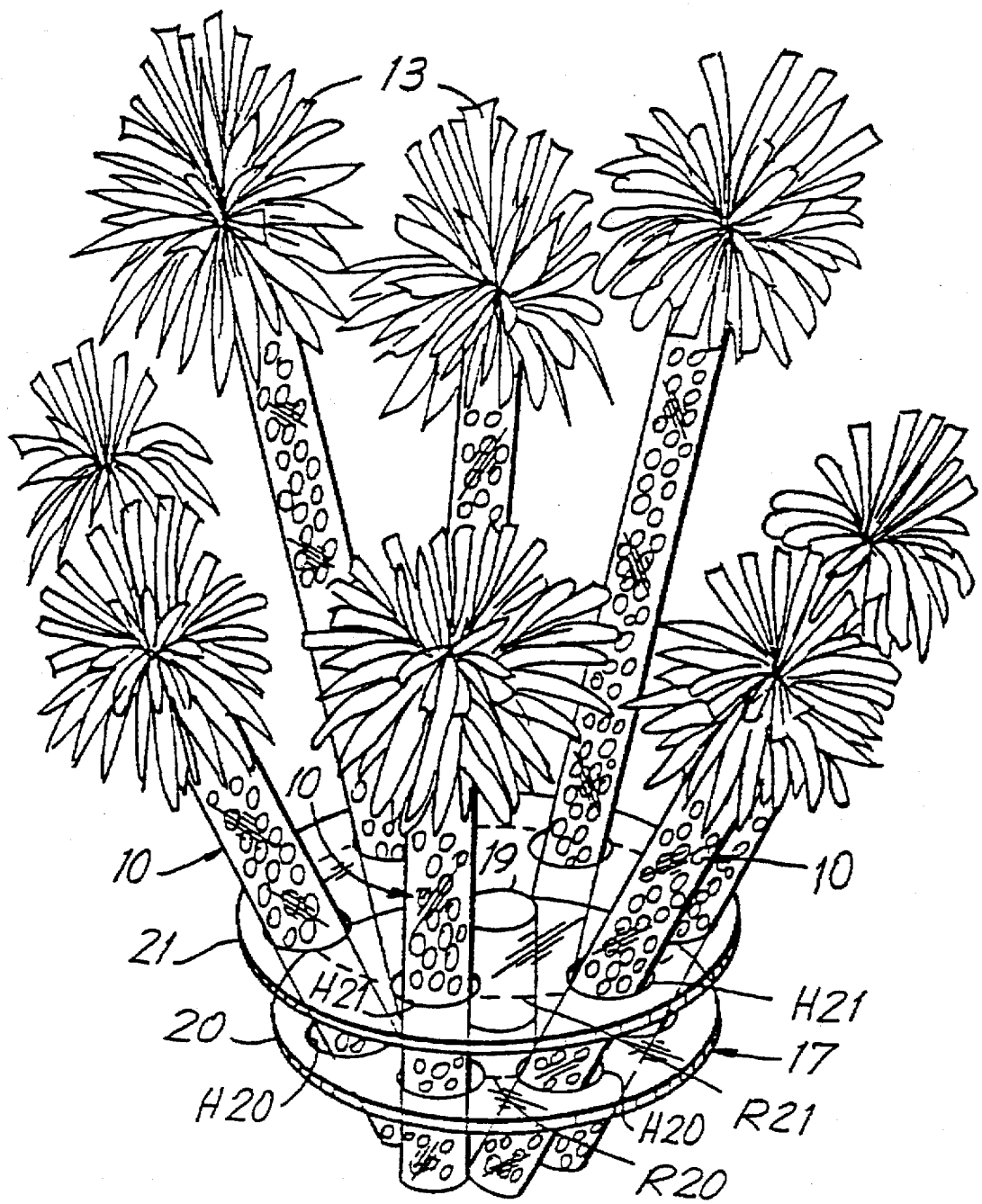
FIG. 16 is a perspective side view of a bouquet arrangement of a floral like elements in a rack withou a base.
Figure 17:
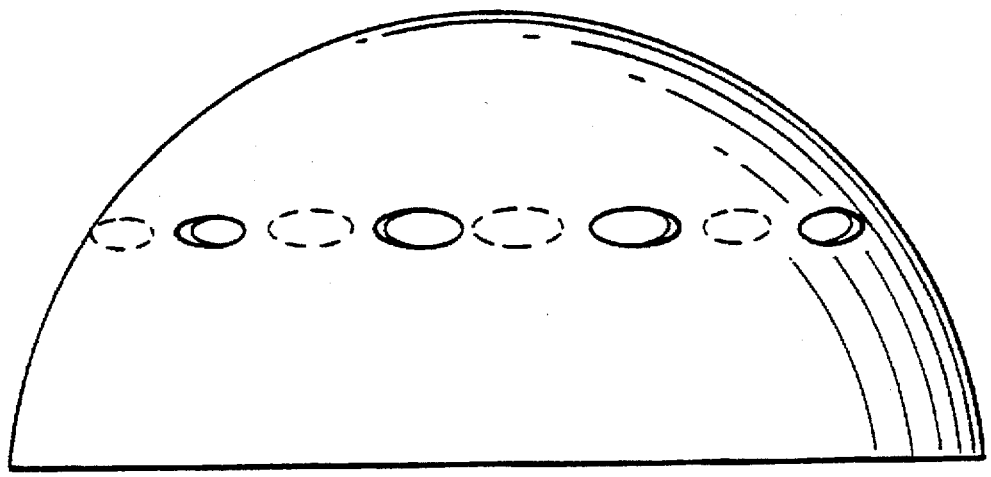
FIG. 17 is a side view of an apertured dome or hemisphere rack.

A rack for the present centerpiece for supporting the decorative containers may have a central post or be of another design. For example, the rack may consist of an apertured cylinder, as depicted in FIG. 14, a clamshell design, as depicted in FIG. 15, a baseless rack which positions the decorative containers which are supported directly by a table or the like, as shown in FIG. 16, an apertured hemisphere, as depicted in FIG. 17.

It will be appreciated that in centerpiece assemblies in accordance with the present invention, while the floral-like elements 10 may be identical or different from each other, the bouquet formation arrangement varying depending on the rack configuration and the selection of elements. Because the rack is composed of components, all of which may be clear and transparent, the decorative impact of the bouquet may be made to depend on the colors of the candies contained in the wand-like stem of the tubular element 11 of the floral-like elements 10, as well as the formation and the colors of the pom-pom 13 which crowns the stems and on the orientation of the floral-like elements 10 produced by the selected supporting rack.

Figure 18:
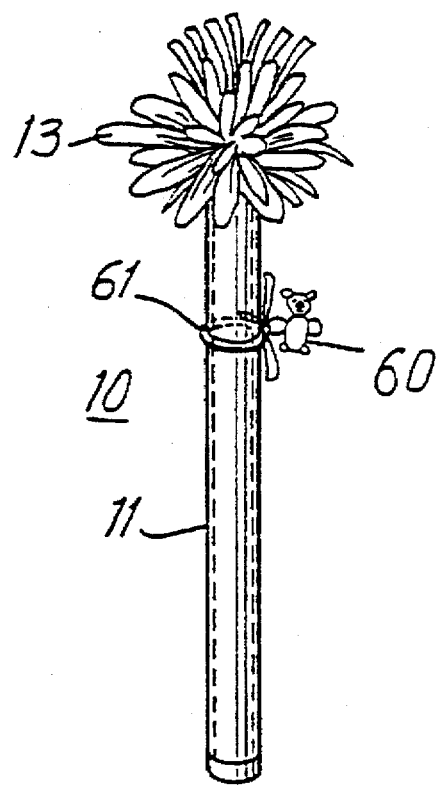
FIG. 18 is a side view of an additional decorative object attached to a container.

In a preferred embodiment of a rack or stand according to the present invention, a central upper tier plate 28 as shown in FIG. 6 is provided in order to accomodate theme object such as a figurine or stuffed animal, a seasonal symbol, a religious symbol, a sports symbol, a sign or indicator, a banner, or the like. Of course, the stand or rack should also include means for retaining the theme object, if necessary. A banner may be placed around a portion of a centerpiece, which banner may display a message, greeting or other text or symbol. Alternatively, a theme object 60 may be affixed by suitable means, such as ribbon 61 to one or more of the tubular element 11 of the decorative containers as shown in FIG. 18, which may be inserted or contained in the rack, in order to enhance the party favor aspect of the functionality.

Instead of providing a centerpiece bouquet arrangement of real flowers for festive occasions as well as favours to be distributed to quests at the conclusion of the occasion, one may gain a significant reduction in costs by using a centerpiece assembly in accordance with the invention, which by its very nature functions not only as a centerpiece bouquet arrangement, but also as a supply of party favors to be distributed.

The centerpiece assembly of the present invention may also provide a candleholder, e.g. a candle replacing the central floral-like element 10 as shown in FIG. 10, allowing the centerpiece to support a flaming candle in a safe and controlled manner.

It is not necessary that the tubular element 11 of the floral-like elements 10 have a removable stopper 12 at its bottom end, for in practice this end may be closed, or permanently covered, in which case the pom-pom 13 at the upper end of the tubular element 11 may be is anchored on a screw-on cap so that the wand can be loaded with candy through the upper end of the wand, the cap being unscrewed when the candy is to be discharged from the wand. Other closure methods are also possible, including bayonet, snap-on, friction fit, adhesive, partial fusion of adjacent plastic elements by thermal or ultrasonic bonding, or the like.

The closure need not be fully separable from the tubular element 11, and in fact, when the floral-like element 10 is to be distributed to young children, it is preferable that the closure be attached to the wand to avoid accidental ingestion. In this case, as shown in FIG. 20, the closure may be tethered to the wand by a tether 61, which attaches to or encircles the tubular element 11 on one side and the upper closure structure 62 comprising the pom-pom 13, main cap 15 and the inner cap 16. The removable stopper 12 at the base may also be tethered to the tubular element 11 by a stopper tether 63.

Alternately, the closure may comprise a hinged structure which is tiltable with respect to a longitudinal axis of the wand, as shown in FIG. 19. When the closure 64 is tilted on hinge 65, full or partial access may be gained to the compartment of the tubular element 11 through aperture 66. A similar structure known to those skilled in the art is employed in the PEZ (TM) dispenser, which actively dispenses candy. When employed as a dispenser, the wand is also supplied with a feed mechanism to juxtapose the contents proximate to the selectively formed aperture, and preferably a means for refilling the dispenser.

DIMENSIONS OF CONTAINER AND RACK

The present decorative container may be combined with similar containers to form a table centerpiece. It has been discovered that when so used, the decorative containers are placed on a stand or base, and the combination of stand or base and decorative containers should preferably not obscure line of sight visibility. This is particularly problematic when a centerpiece is formed having eight decorative containers on a lower level and four containers on an upper level, such that cross table visibility is substantially limited. The total height preferably should not exceed about 21–24 inches (56–61 cm) for a centerpiece having twelve decorative containers, eight on a bottom row and four on a top row, each being 9–15 inches in length, and the height of the vision obscuring tops of the container decorations on the lower level being below about 17 inches and the vision obscuring tops of the container decorations on the upper level being below about 21–24 inches. Thus, the height of four or more decorative containers, arranged in a circular array at the uppermost level, should not exceed 21–24 inches. The centerpiece design is preferably such that, when placed on a dining table, a direct line of vision through the centerpiece is not totally obscured by the placement of four or more floral pom-poms clustered together at eye level. A normal dining table has a surface which is 26–32 inches off the floor. The normal eye level over a table is approximately 18 inches. When a linear array of decorative containers is used, then this height limitation is less important. Thus, while linear arrays may be of any size, circular arrays, which tend to obscure visibility of persons across a table when centrally placed, are preferably limited in density at the normal eye level. A centerpiece designed according to these criteria ensures that the aesthetic structure of the centerpiece simulates a high quality floral centerpiece, placed in the center of a table, without obscuring various individuals from each other. The stand supporting the decorative containers may present them in a fan formation without limitation in height, and preferably having a height of less than about 24–36 inches, in a radial formation, in a staggered radial formation, or other such arrangements as are known in the art. A preferable size for the decorative containers when used as a table centerpiece is about 8–12 inches. For use in a table centerpiece, the decorative end closure preferably has a free diameter of 2–8 inches, and the hollow elongated member preferably is a tube having a diameter of 1–1.5 inches. While larger sizes with dense concentrations of members are possible, these are not desirable for use a table centerpiece, because they may obscure individuals from view.

In a preferred embodiment, the length of a tube forming the elongated hollow member has a length to diameter ratio relationship of less than approximately 40:1 and greater than approximately 3:1 in order to achieve the aesthetic values of the desired decorative container.

The preferred size relationship of the hollow elongated member of the conatiner and the pom-pom may be expressed as follows. The preferred minimum ratio of the maximum diameter of the-pom-pom to the maximum diameter of the hollow elongated member is approximately 1.25:1. The preferred maximum ratio of the maximum diameter of the pom-pom to the maximum diameter of the hollow elongated member is approximately 35:1.

The preferred maximum ratio of the maximum diameter of the pom-pom and the length of the hollow elongated member is approximately 2:1, which is especially applicable to decorative containers having a low aspect ratio.

When decorative containers are used in a bouquet arrangement in a display stand, it is preferable that together they emulate various types of floral arrangements, known to those of ordinary skill in the art. This may be achieved by selection of color, size, shape, structure, length and positioning.

In a preferred embodiment, an array may be prescribed by an injection molded plastic or vacuum formed plastic rack or stand 104 including receptacles 105 for the ends of the decorative containers. A particularly preferred embodiment is a vacuum formed plastic fan-shaped array for 9 inch long, 1 inch diameter decorative containers.

Another embodiment comprises an arrangement of decorative containers in a rack or display stand in a non-circular array having multiple levels of origin for the decorative containers. In a more preferred embodiment, a multiple level rack is combined with decorative containers having varying lengths in order to achieve a fountain effect.

The rack or stand of the present invention, while generally used to support and arange a plurality of decorative containers may also be designed to support a single decorative container, and may also be integrally designed into the container.

The present invention also comprises decorative containers having a much smaller size. In particular, the decorative containers of the present invention may also have a form factor in the 3–8 inch range. In this embodiment, the decorative end closure preferably has a free diameter of between about 0.75–2.5 inches. The elongated hollow member has a diameter of between about 0.2–1.5 inches. While the 3–8 inch decorative containers may generally be used for holding same purposes contents as larger containers, such as candy or industrial samples, containers of this size are more preferably employed with other types of contents. For example, a 6 inch long, 0.3 inch diameter tubular elongated member with a 1 inch diameter decorative end closure may contain a writing instrument, e.g. a pen or pencil.

CANDY PELLET CONTENTS

The term "pellet," as used herein, refers to small pieces of candy whose sizes are small enough to fit within the tubular wand, whether or not each piece of candy is wrapped. When the nature of the candy is such that it will soften or melt when the wand is likely to be found in an environment whose ambient temperature is 80 degrees Fahrenheit or higher, then the candy pellets should be so wrapped to prevent leakage of the candy. Of course, candies having different melting or softening temperatures or having differing consistencies may be wrapped or supplied in accordance with these varying characteristics. The candy pellets filling the tubular element 11 may be of mixed types.

FIFTH EMBODIMENT WITH AN ELECTRONIC MODULE

A preferred embodiment of the present invention provides an electronic module to provide an additional functional, decorative or novelty effect to the individual element, an array of elements, or to a plurality of arrays. The individual elements may be floral-like elements as disclosed above, or may be another configuration decorative container having an elongated hollow member, a decorative end closure, and an aperture to filling the elongated hollow member with goods.

A decorative container apparatus according to the present embodiment thus comprises a hollow elongated member serving as a container for user provided goods, a decorative end closure on at least one end of the hollow elongated member, and protruding therefrom, and an electronic module providing enhanced functional, decorative and/or novelty functionality.

According to the present embodiment of the invention, the tubular element or elongated hollow element of the decorative container includes, preferably at or in the decorative end closure, certain electronic devices. These devices may perform any type of function; however, it is preferred that the electronics be intended for novelty effect or be of a decorative nature.

A first variation, shown in FIG. 21, includes a small electronic circuit 71 in the end closure 72 which includes a power source, preferably two watch-type batteries 73, subminiature or miniature type cell or cells, e.g. size AAA or 9V, with a blinker circuit. The blinker circuit is preferably formed from a timer circuit, e.g. an ICL7555 CMOS timer circuit, configured with various associated elements to provide an approximately 5% duty cycle pulse with a repetition rate of approximately 750 mS to one or more light emitting diodes 74 (LEDs) arranged in the decorative end closure, at the perimeter of thereof, in the distal end closure or in the elongated member. The repetition rate and duty cycle can, of course, be tailored for the aesthetics, ergonomics and particular components of the particular application. The intensity of the LEDs may be varied to be visible under the ambient conditions without being particularly distracting. An ambient illumination intensity detector may be employed for this purpose, e.g. a photocell, CdS detector, phtodiode, etc., which would be used to alter the light output by modulating number of LEDs, the average ON current to the LEDs, or the repetition rate (e.g. pulse amplitude modulation, pulse width modultion, pulse frequency modulation, or a combination of techniques). The intensity of the LEDs is also influenced by the position within the element. An LED buried in a pom-pom or puff would likely require a greater light output than an LED located at the periphery of the decorative closure.

The blinking circuit may be further enhanced by providing a proximity sensing function to activate the blinking when a person or other object approaches or is nearby. The proximity sensing element can be of any known type, but it is preferred that the element be a sound detection device or a light intensity detection device. Other known proximity devices suitable for use in the present invention include an optical reflectance detector, a sonar-type acoustical reflection signature detector, a variable capacitance or reluctance based proximity detection, and a sound recognition device. These proximity detectors may activate the electronic device for the duration of the proximity of the person or object or for a set period after being triggered. Other arrangements as known in the art may also be suitable. The proximity sensing device serves two functions. First, it conserves power by activating the primary electronic function only when it is likely that there is an observer. Second, it provides an increased complexity of operation which will be more interesting to the observer.

Other types of activation systems for an electronic module are also possible, including magnetic switching, radio frequency signals, infrared signals, motion detection, mechanical switching, vibration detection, tilt detection and shake detection.

In another embodiment, a "light organ" system, the electronic circuit includes a plurality of colored LEDs 74, e.g. red, yellow, green and orange or bicolored or tricolored LEDs being selectively activated based on a frequency content of an acoustical signal received by the an acoustical transducer 75, e.g. a microphone. This embodiment is especially applicable for use of the device as a centerpiece at a party where music will be present. The preferable power source in such a case would likely be 2 "C"-type carbon-zinc or alkaline cells due to the greater power demand, which may be inserted into a compartment 77 in a base 76, as shown in FIG. 22.

Another embodiment includes a radio receiving device, which may be used instead of the acoustic transducer to control the "light organ" system described previously, or merely as a novelty radio. In this case, the radio speaker 78 may be mounded proximate to one or the end closures or hidden in the decorative end closure.

A still further embodiment includes a plurality of LEDs 79 or preferably multicolored LEDs in the end closure electronic package 80. These LEDs are arranged densely packed and illuminating a plurality of light pipes 81. The light pipes may form a part of the decorative end closure and also project into the hollow member. The light pipes will transmit the colored light from the LEDs to the tips 82 thereof. By varying the color of illumination of the light pipes by the multicolored LEDs or plurality of LEDs, attractive visual effects may be obtained. Thus, by cyclically varying the color, a swirling effect around the decorative ornament may be obtained.

In a preferred embodiment, a plurality of light sources are sequentially activated around the rack or stand structure, or in the decorative containers themselves. These light sources are preferably subminiature incandescent bulbs or LEDs and are driven by a circuit which may be used to control both sequence and amplitude of each element. The sequence may vary according to a plurality of stored programs, be responsive to externally supplied parameters, or respond to music or light. The light sources may also be provided in a dot matrix display to display patterns or messages. The dot matrix display may be monochrome or multicolor, and is driven in a known manner.

In another embodiment, liquid crystal display (LCD) elements are provided on either the rack or stand or in conjunction with the decorative container. The LCD may be used to create decorative patterns or to convey information.

In yet another embodiment, as shown in FIG. 24, a decorative end closure 83, which preferably includes a pom-pom 13, is affixed to a moveable element 84 which is attached to an electromechanical drive system 85. The electromechanical drive system may be activated by any of the aforementioned proximity sensors or acoustical signal sources. This embodiment is similar to the known "dancing flower" or "dancing can" systems known in the art. However, the present system includes a functional container. Prior art systems do not comprise an enclosed space provided for holding and/or transporting contents unrelated to the "dancing" action.

The electronic module may also include other types of vibrating mechanisms, which may be manually initiated or electronically controlled.

A further embodiment of the present invention comprises a flash lamp, as shown in FIG. 25, preferably a xenon-type flash lamp or strobe lamp. In this case, the flash lamp 86 may functionally replace the LEDs described above. However, flash lamps are somewhat different in configuration and function from LEDs. Therefore, it is preferred that the flash lamp be contained in a separate module 87 in proximity to an end closure of the hollow member. Light emitted by the flash lamp may exit the hollow member in a number of ways. First, the hollow member may be formed or transparent or translucent material 88, thus allowing a direct light transmission. Second, the flash lamp tube may be in proximity to a light pipe or preferably surrounded by a plurality of light pipes 81. The light pipes may then be bundled and form part of the decorative end closure. Such an arrangement will create an effect of "lightning tips" of a floral bouquet because of the transmission of light to the tips 82 of the light pipes 81. Light pipes 81 may also cause light to be emitted along the elongated member. Depending on the structure and composition of the elongated member, the wall itself may serve as a light pipe. Because flash lamps emit light in the ultraviolet range, certain fluorescent pigments and components may be employed to create special lighting and color effects based on the flash lamp excitation.

A further embodiment of the flash lamp embodiment includes a light sensor 89 which will trigger the flash lamp in one decorative container in relation to a proximate flash lamp in another decorative container, or other communication system. The decorative container should also have a trigger based on a timer circuit with a relatively long time constant, so that activation is assured. In this arrangement, after the lamp has been triggered, it is refractory for a set period of time determined by one or both of a timer or control circuit and a flash capacitor recharge circuit. When the refractory period has expired, the flashlamp is triggerable. The trigger for the lamp is based on a light detector, adapted to detect a flash from a neighboring unit. The flash may occur immediately, thus causing the flash lamps to fire simultaneously, or after a short delay, which would effect a staggered firing. Additional circuitry could also be employed to achieve an extended staggered triggering, so that few or none of the flash lamps will fire simultaneously, but rather will initiate a long pattern of flashing across a room. Each trigger system also includes a relatively long time constant timer which would trigger the flash after a set period. This will ensure that the flash process is initiated, and will allow a single unit to operate. After the flash is triggered, the process repeats.

Extended staggered triggering may be achieved by setting various triggers with different delays from the previous flash prior to firing. Thus, the shorter latency triggers will fire first, followed by the longer latency triggers. The trigger latency is preferably shorter than the recharge cycle/refractry period, so that the longer latency units fire before the shorter latency units recycle.

Because the various units are interactive, the pattern of triggering will change as units are removed from centerpieces or moved around a room, creating an interesting effect.

An alternative triggering embodiment employs an acoustic trigger, which may be music or an audible or inaudible acoustic signal. The acoustic trigger may be a simple sound pressure level activated trigger, or a complex music or noise based detection syste. Of course, the units may detect a plurality of different or identical triggers, including nearby flashes, acoustic signals, and data transmissions, allowing complex interactions and control of the units.

In yet another embodiment, the decorative container or containers are associated with a base. The base is designed to be stable, such that the associated containers and base do not tip over, even when one or more of the containers are removed, or the containers are unevenly filled with dense contents. The base may contain an electrical or electronic circuit, for example a motor driving a rotary platform, on which the containers are mounted. The base may have a single level of units, or may have a multilevel array of units. The base may include an illumination source for illuminating the decorative containers associated therewith.

The base 76 may also include electronics for controlling or activating effects in the individual containers. Thus, for example, the base may include a flash lamp or other optical source and associated drive and control circuitry. A portion of the hollow elongated member 90, preferably at bottom portion thereof, is intimately associated with a portion of the base 79, such that optical output from the base is transmitted to the member through a light transmissive element 91. At the point or area of association, a light transmissive member transmits the light to another portion of the member, preferably a decorative upper portion having a decorative end closure, e.g. a pom-pom or other device. The light transmissive element is preferably divided so that the decorative end portion may be affixed separately from the light transmissive element. The decorative end portion may then radiate the light. This arrangement allows a fully passive and replaceable decorative container to be associated with a reusable and sturdy base unit, thus reducing the incremental cost of the wands. Further, beciuse flash lamps have a high voltage drive, this arrangement will increase the safety of the system. Finally, because the tubular member and decorative end fixture are fully passive, with only a light transmissive element, no volume is lost due to an electronic module and associated power source. An added advantage is that more efficient and economical "C" or "D"-type cells may be used in the base which serve as both power source and ballast.

The base, or course, may also serve other functions. For example, the base may be an element of a party game, such as a data transceiver. Thus, each table, on which the base and decorative containers are placed are a "team". A master of ceremonies ("MC") asks a question of the audience. When a person believes that he knows the correct answer, he pushes a button which activates the base to flash the decorative elements and send out a signal, which may be optical, infrared, audio, supersonic, or radio frequency, e.g. AM, FM, spread spectrum transmission, etc., which prevents other base units from also being activated. The MC then determines whether the answer is correct. If so, the "team" scores and the base unit indicates the increment on a score keeping device, based on the ruling of a judge, who may be the MC. If the answer is incorrect, a penalty may be extracted from that team, such as a score decrement. The second base to register a button push or activation may then be given an opportunity to answer the question, in a manner analogous to the first base unit. As in television game shows, a "daily double" or the like may be programmed, which may be associated with a unique visual or auditory signal. A plurality of signal may be available for each base unit. For example, the first base flashes white light. If the answer is correct, the base flashes blue light, which may be formed by filtering the output of a single white light source or providing a plurality of different color light sources. An incorrect answer causes a red flashing light. A daily double or other special feature causes a green flashing. Alterations and variations of the present example will be known to those skilled in the art, and are included within the scope hereof.

In another embodiment, each decorative container device contains as tranceiver, which may be infrared or radio frequency, e.g. TDMA, FDMA, CDMA, spread spectrum, etc., to provide "cellular wanderful" (TM) communication between guests. This telecommunication system may be centrally controlled, or a direct communication type system with distributed control. Calls or transmissions may be made anonymously by providing a voice altering function. The telecommunication function may also be used to communicate with food service staff to assist in providing excelent service at a party.

In order to assure efficient transmission of light into and across light pipes, a fluid or sealant having appropriate refractive index may be used. This fluid or sealant should be selected to be in accord with the intended use of the device. Thus, if foodstuffs are contained in the hollow member, any such fluid or sealant must be nontoxic and approved for such use and reasonably contained away from the edible contents. Thus, if contained properly, a silicone or food oil may be used. Preferably, however, an appropriate food-grade silicone RTV sealant may be used to ensure efficient light transmission between the various optical elements.

Thus, it is apparent that the invention, according to the present electronic embodiments comprises an elongated member having a decorative end closure, an elongated hollow member, serving as a container for user definable contents and an electronic or electrical element designed to enhance the decorative or novelty value of the apparatus. Further, while the container apparatus may be used alone, various features become possible when a plurality of containers are used in combination. Finally, the electronic module may be physically separated from the container to provide a reduced cost container with a reusable electronic module. This latter arrangement facilitates the use of the container as a party favor and enhances the decorative nature of an arrangement of the containers as a party centerpiece.

STORED ENERGY EMBODIMENT

The invention according to the present embodiments comprises a hollow elongated member serving as a container for user provided goods, a decorative end closure on at least one end of the hollow elongated member, said decorative end closure being made of a material compatible with the intended use, and a device adapted for the rapid release of stored energy producing a novelty and/or decorative function.

In these embodiments of the present invention, the hollow elongated member or the decorative end closure may be associated with a single use novelty device, such as a sparkler, "party popper", expulsive streamer, or other device which provides an pyrotechnic, explosive or explosive-like release of energy in a safe and controlled manner. The decorative end closure in this instance is associated with a device which stores energy which may controllably be released, and which, when released, produces a decorative or novelty effect. The stored energy may be chemical or explosive, pneumatic, mechanical, or other known energy storage means. The stored energy is preferably released under the control or influence of a person.

Mechanical energy storage systems are known in the art, and include springs. A spring may be advantageously employed to expel objects from a tube or other device. Thus, streamers, rice, jumping "snakes" and other articles may be forcefully expelled using stored mechanical force.

The function of a sparkler device is known in the art. In general, these-comprise a ground mixture of a metal-based pyrotechnic composition bonded to a wire. When ignited, the pyrotechnic composition burns brightly from a distal end to a proximal end, the ignited portion producing a bright glow and radially expulsing sparks, and igniting an adjacent portion of bonded pyrotechnic composition, so that the combustion process proceeds in a controlled and spectacular manner. Various compositions may be used which burn in various colors. When the present invention comprises a sparkler, the decorative end closure is preferably formed from fire proof or fire retardant materials, and provides a small aperture for securely mounting the central wire of the sparkler. A plurality of sparklers may also be mounted on each decorative end closure. It is also within the scope of the present invention to provide the sparklers attached to the hollow elongated member or to the base, or contained within the hollow member.

Figure 28:
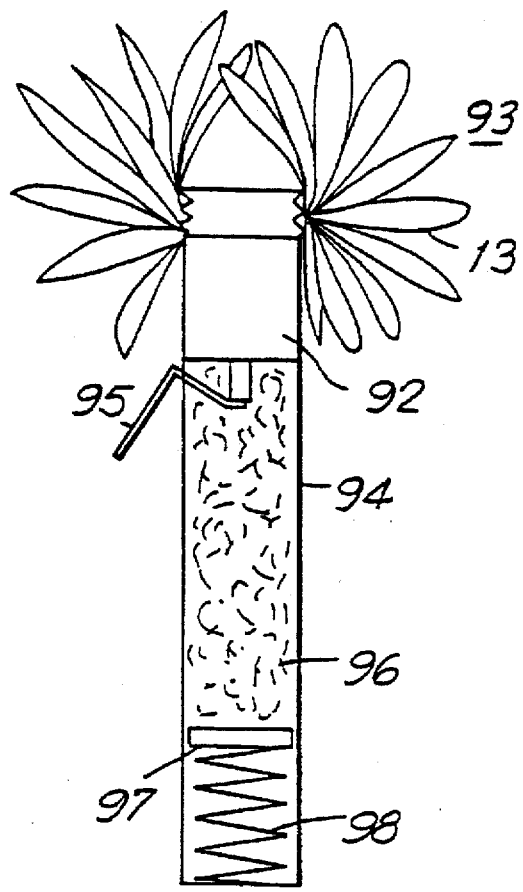
FIG. 28 is a side perspective view of a wedding popper.

In other embodiments, as shown in FIG. 28, a "party popper" 92 element is included as a part of or in association with the decorative end closure having a pom-pom 13 or the like. A "party popper" is a device which contains a small amount of explosive composition, a fireproof material to be expelled from the popper, a releasable end cap, an outer container and an ignition device. The ignition device is a string which, when forcefully extracted from the outer container, causes ignition of the explosive composition. The pressure in the outer container rapidly increases, until the releasable end cap is expulsed. The fireproof material is released and forcefully expelled. The fireproof material is preferably a streamer. In the present embodiment, the "party popper" 92 device is preferably incorporated at the center of the decorative end closure 93 or at the distal end of the decorative container 94. The decorative end closure in this instance would preferably be fire proof. The ignition device string 95 is routed from an internal portion of the decorative end closure to an accessible location on the outside of the decorative container. When pulled, the string will ignite the small amount of explosive and cause the forceful expulsion of streamers or the like, and create a festive novelty effect. A party popper can also be triggered by removing or opening a closure device of the decorative container. The explosive release also causes a popping sound. Alternatively, the string ignition device could be replaced with an electronic ignition device. In this instance, an electric current locally heats a wire to a temperature which either directly causes ignition of the explosive charge, or ignites a primer charge. In the case if electric ignition, it is preferred that the electric current source be shipped separately from the decorative container and that the necessary electrical connections be made immediately prior to use. In a preferred embodiment, the electric current source resides in a base unit, and the decorative containers are inserted in holders which facilitate the electrical connections. The "party popper" may be triggered by a manually operated electrical switch, or by other means. For example, the trigger could be a radio frequency signal, an infrared light transmission or an ultrasonic wave. In any event, the device should have a fail-safe trigger mechanism and also be positioned to avoid injury in the event of inadvertent or unexpected ignition.

In a preferred embodiment, a "wedding popper" contains rice 96 and has a party popper 92 device. When opened or activated, the party popper 92 ingites, releasing streamers. A spring 98 loaded plunger 97 may advantageously expel the rice 96 toward a wedding couple. A wedding popper may be a resuable or rechargeable device, or may be a keepsake.

The "party popper" embodiment decorative container may also be used in conjunction with the party game embodiment, such that the decorative containers of a winner will be activated.

In another embodiment, the use of explosive compositions is avoided in order to facilitate transportation and reduce safety hazards. The stored energy source is a compressed gas canister, which may be air, nitrogen, helium, nitrous oxide or carbon dioxide. The canister may be a metal cartridge, e.g. carbon dioxide, air, or nitrous oxide. When a standard-type cartridge is employed, a mechanical element punctures an end closure of the canister, causing the release of gas. This release may be rapid and be used to expel streamers or the like. The gas release may also be modulated and controlled, to produce a variety of mechanical or acoustic effects, such as driving a turbine device, causing a turbulent flow in proximity to the decorative end closure to cause movement, activating an air-powered horn, inflating a balloon, expelling confetti or streamers, propel objects, etc. Generally available gas canisters contain more gas than is generally necessary for a single decorative container. In this case, a single gas canister may be provided in a central base, which is connected by tubes or hoses to the decorative end closure or hollow elongated member. The release of gas may be controlled or uncontrolled, and the decorative containers may be subjected to the flow of gas simultaneously or sequentially.

Figure 29:
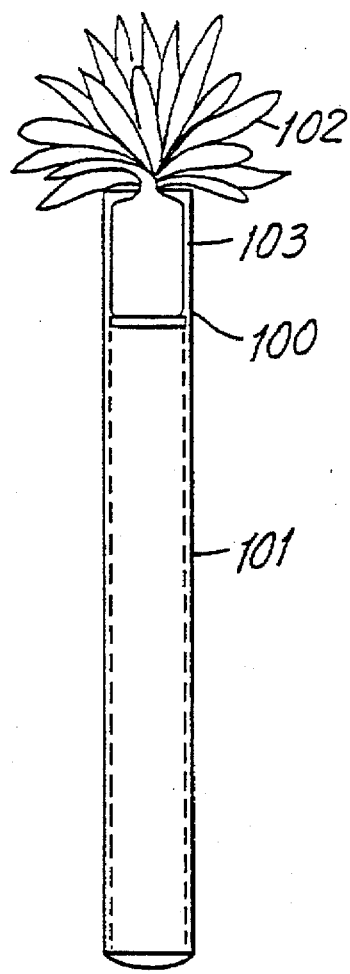
FIG. 29 is a side perspective view of a container including a pneumatic module.
Figure 30:
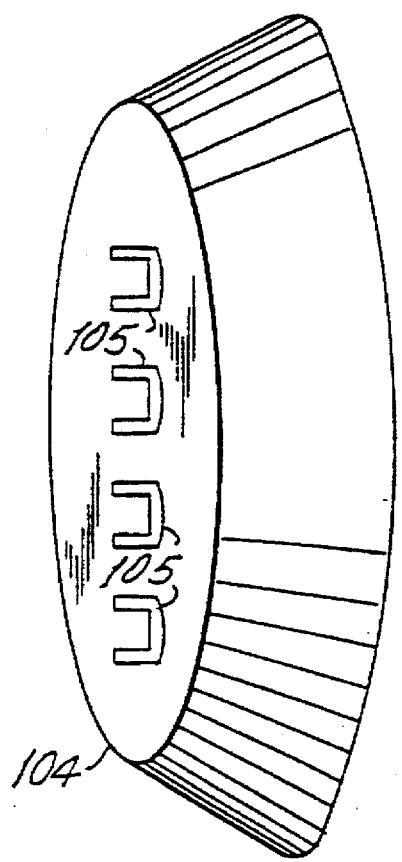
FIG. 30 is a side perspective view of a vacuum-formed rack.

As an alternative to a gas canister, pressurized gas may be created in situ, immediately prior to use. This gas may be stored in a closed compartment 100 in the hollow elongated member 101 or proximate to the decorative end closure 102, as shown in FIG. 29. The closed compartment may be formed integrally by the hollow elongated member or by means of a volume confined gas impermeable membrane (e.g. a balloon 103 in an enclosed space). The pressurized gas may be formed by means of an external or internal pump, the release of carbon dioxide from the chemical reaction of an acid with sodium bicarbonate in aqueous solution, the sublimation of dry ice, preferably accelerated by contact with water, release of carbon dioxide from carbonated water, etc. The pressurization of air in a balloon, at least a part of which is expernal to the container, may advantageously be used for decorative purposes.

In those instances where the gas is produced in conjunction with an aqueous environment, a gas-liquid separation system, such as a gas permeable membrane, is preferably used to avoid the forceful release of liquids, unless this is the desired effect.

The decorative container may also be used as a watergun. In this case, water may be directly pressurized and expelled through a small aperture, or the water may be subject to pressurization by a gas, which provides a pressure reservoir, allowing a continuous stream of water to be expelled. The compressed gas may be in direct contact with the water or may be separated by a flexible membrane or other means for transmitting the pressure. This embodiment is similar in respects to a "supersoaker" (TM) watergun system.

The compressed gas, when released, is preferably shunted to a secondary container wherein the streamers or other contents are held. One portion of the secondary container comprises a large aperture pressure relief valve. When the pressure in the secondary container exceeds the relief pressure of the valve, the valve opens. Because of the large aperture of the valve, the streamers are released and forcefully expelled.

The foregoing descriptions of embodiments are exemplary only, and other pyrotechnic and pneumatic effects as known in the art may also be included as components of embodiments of the system of the present invention.

OTHER DEVICES

The decorative end closure or hollow elongated element may also include a mechanical or electronic acoustic device. Thus, when activated, the decorative container will make noise. The noise may be a radio receiving device, a music box (preprogrammed music) device, a musical instrument (human controlled sounds), or noise maker. An example noise maker is a device in which a weighted piston moves within a cylinder by gravity, wherein air on one side of the piston passes through an aperture with a vibrating element to make a sound. This sound may simulate a cow, for example.

The decorative container may also serve as a whistle, activated by a person blowing by mouth or by moving or waving the elongated member in such manner as to cause a resonance of air in the hollow member. When used as a whistle, the container preferably has a large open space, and therefore has only a small amount of contents, or indeed, no contents at all. In addition, the decorative container may also serve to hold goods when filled, and as a whitle when empty.

PEN EMBODIMENT

A preferred embodiment comprises a pen having, at a non-writing end thereof, a compartment bounded on at least a portion of its radial surface by a transparent window, in which a viscous fluid is contained. In the fluid is a translatable element having a density greater than the fluid, being free to settle by gravitational forces to a lower end of the compartment. The translatable element preferably moves along a guide and has a graphic imprinted on it, with further graphics present in the compartment.

EMBODIMENT FOR PACKAGING COSMETICS

Containers, preferably in the range 3–6 inches, but generally in a broad range of sizes, may also be used with various types of cosmetic products. These products include perfumes, colognes, eye liner, mascara, blush, nail polish, etc. Because of the relatively high cost of cosmetics and the generally relatively small size of the containers, the materials used in the decorative end closure can reasonably be made of higher quality and/or cost materials and constructions than containers intended for other purposes. Thus, the decorative end closure could be constructed entirely of fiber optic elements 81, with an LED 74 or incandescent bulb in the cap, powered by watch-type batteries 73 and activated by a switch 106. Such construction might be less suitable for larger size decorative containers. Other light sources may also be used in either the tubular element or the rack structure, or both, including neon bulbs, fluorescent bulbs, electroluminescent panels and the like.

In another embodiment of a decorative cosmetic container, the decorative end closure comprises a cosmetic applicator. Thus, the pom-pom structure also functions as a brush or the like. This may be formed of natural or synthetic fibers or strands. Preferably, the fibers or strands are of natural hair and may be colored or multicolored with a predetermined pattern, being coordinated with the hollow elongated member.

When the decorative container is intended for use as a direct cosmetic container, the closure system generally should form a good seal, have a life cycle of a sufficiently large number of opening/closing cycles for the intended use, and be easily operable by hand using the pads of the thumb and forefinger only. This is because cosmetic users often have long fingernails, which may have wet nail polish on them. The decorative container for cosmetic use has an elongated decorative end closure which has a surface externally accessible and has a screw-type closure. The decorative end closure may extend away from the aperture of the hollow elongated container, or may act as a sleeve which fits circumjacent to a portion of the hollow elongated container. The closure system may also comprise a bayonet closure, a friction seal, an O-ring seal, snap closure or other known closure systems.

A cosmetic container according to the present invention may be used for various types of facial cosmetics and skin care products, perfumes, bath beads, bath salts, soap flakes, nail polish, and the like. When the contents are liquid, the container preferably comprises an elongated squeeze bottle with a nozzle at an apex thereof. The nozzle may be a part of or embedded in a pom-pom, or may be separate from the decorative closure.

In the event that the decorative container is a direct container for cosmetics, it is preferable that the decorative end closure be a sheath-like or a screw on closure.

FRAGRANCE OR AROMA DISPERSION

The decorative container of the present invention may advantageously be used as a fragrance or aroma dispersion device. The decorative end closure has a high surface area, and the elongated hollow member projects the decorative end closure into free space. Further, the elongated hollow member has a sufficient volume to hold a fragrance source in addition to other contents, if the fragrance is a liquid. When used as a fragrance or aroma disperser, a wick or other controlled flow device, e.g. capillary tube, transmits the essential oil or fragrance solvent into or near the decorative end closure. The fragrance may then be dispersed into the air both directly and secondarily from the surfaces of the elements making up the decorative end closure.

It is preferable that the decorative end closure have a floral appearance. In this case, the fragrance is preferably a floral scent, and more preferably a scent relating to the type of flower simulated by the decorative end closure.

In a preferred embodiment, a decorative container is used for perfume or as a perfume sampler. In this case, the decorative end closure or parts thereof are impregnated or treated with the perfume aroma components. The decorative container therefore may be used as a marketing tool which provides both a sample of the perfume and a take-home gift.

BOTTLE TOP EMBODIMENT

Figure 31:
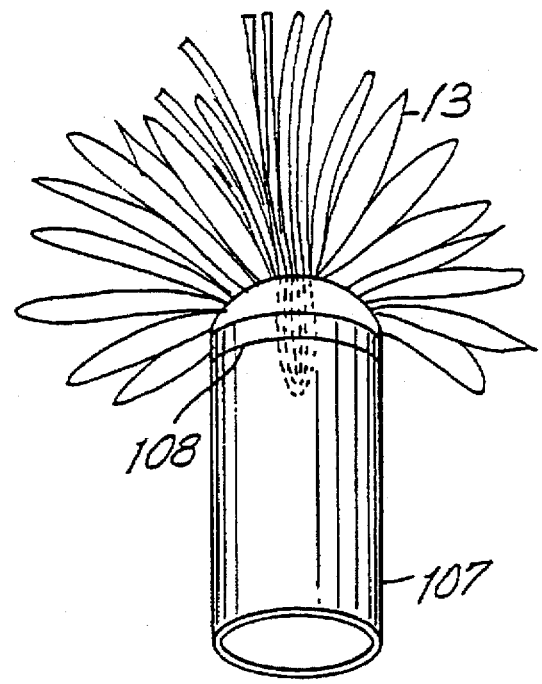
FIG. 31 is a side perspective view of a bottle in accordance with the invention.

Another preferred embodiment of the present invention comprises a decorative fixture for a bottle, more preferably a glass bottle containing a liquid, and most preferably for wine or liquor, comprising a pom-pom affixed to an attachment system for attachment to the top of the bottle, as shown in FIG. 31. The pom-pom 13 is affixed to an endcap 108, and preferably has a diameter greater than the diameter of the neck of the bottle, and may be greater than a maximum diameter of the bottle. The attachment system 107 may be a plastic, foam, rubber, fabric, netting, or paper sleeve which fits over the neck of the bottle. The attachment system may also be a series of rings, clip or clips. Preferably the attachment system is designed to accomodate variations in the neck size of various bottles. The sleeve may be a decorative sleeve, and information bearing sleeve or a transparent sleeve.

In a preferred embodiment of a bottle top, the attachment system comprises heat shrink tubing which is placed around the neck of a bottle and heated with a heat source, such as an electric heat gun. In another embodiment, the attachment system comprises a styrofoam endcap sized to form a compression fit over the neck of the bottle.

DECORATIVE CONTAINERS COMBINED WITH OTHER OBJECTS IN CENTERPIECES

The decorative container according to the present invention may advantageously be arranged with real or artificial flowers or ballons or both in a centerpiece arrangement. In such instance, the decorative container(s) may be selected to match or to contrast the flowers or balloons.

SHIPPING METHOD

The decorative container of the present invention poses a particular difficulty in transport and shipping. In particular, when the decorative containers are placed in a stand or base which holds a plurality of units, it is difficult to provide appropriate packing materials and containers. It has now been discovered that the decorative containers may be safely and easily be transported by first wrapping the array of decorative containers in the stand or base in stretchable plastic wrap such as Saran wrap or equivalent. The wrapped assembly may then be placed in a cardboard box, and the base is firmly positioned with respect to an outer cardboard shipping box. Additional padding material such as crumpled newspaper or shipping "popcorn", which may be made of styrofoam, starch, popcorn, etc., may also be employed. The preferable material is polyvinyl chloride (PVC) film, which has a self-cling property. The film is stretched around the members forming a bound system, held in place by the splaying of the elongated members, at a portion distant from the decorative end closure to avoid crushing thereof, to form a bound system of rack and wands. In a preferable embodiment, the rack comprises a plurality of plates having planes parallel to the base, the plates having a fixed distance from the base of the rack. Between any two plates, a portion of the hollow elongated members is exposed, and the plastic wrap is encircled around these members. Because the wrap has "cling", it holds the elements in place with respect to the rack. The rack is preferably positioned with respect to the outer shipping container by a sleeve, preferably formed of corrugated paper, which presses the rack against the base of the outer container which is held in place by the top of the shipping container. Alternatively, a structure fixed to the base of the shipping container may positively engage the rack and hold it in relation to the shipping container.

CHRISTMAS TREE ORNAMENT

In a preferred format, the decorative container of the present invention may be used as a hanging ornament for, e.g. a christmas tree, etc., as shown in FIG. 20. Such hanging ornamental use of the decorative containers, such as a floral-like element 10 is characterized in that there must be a hook or place for attachment of a hanging device 109 to safely support the entire decorative container, preferably by means of a tether 110, holding the tubular element by means of a snugly fitting ring 111. The size and weight of the decorative container should be low enough such that the tree limb, etc, from which the decorative container is suspended is not overly stressed. Thus, for such application, the container should be 6–12 inches long with a hollow elongated member diameter of approximately 0.75–1.25 inches. Decorative containers having a weight greater than that which would safely be supported by a single tree limb, etc, may have a plurality of suspension elements for attachment to a plurality of suspension points, to distribute the load.

When used as a christmas ornament, the end of the hollow elongated member distal to the decorative end closure may be formed like a candy cane. The hollow elongated member itself may be further embellished with a helically wound ribbon member 112 about its periphery. The ribbon member is preferably located around the elongated hollow member; however, if the elongated hollow member has a transparent or translucent wall, it is possible to place a ribbon on the inner surface.

While there have been shown and described preferred embodiments of a centerpiece assembly simulating floral bouquet in accordance with the invention, it will be appreciated that many changes and modifications may be made therein without, however, departing from the essential spirit thereof.

I claim:
1. A centerpiece assembly comprising:
   (a) an array of elements, each element comprising a stem portion having a hollow, an end and a decorative pom-pom portion positioned distally with respect to said end, and wherein said stem portion and said pom-pom portion simulate a flower; and
   (b) a structure to receive said respective stem portions of said array to support said elements in a bouquet-like configuration.
2. A centerpiece assembly as set forth in claim 1, wherein access to said hollow is provided axially.
3. A centerpiece as set forth in claim 1, wherein said hollow comprises transparent material and colored contents.
4. A centerpiece assembly as set forth in claim 3, wherein said contents comprise colored jelly beans.
5. A centerpiece assembly as set forth in claim 1, wherein said pom-pom portion has an axis and is formed by a puff having a distinctive color from which emerges an axially directed cluster of multi-colored ribbons.

6. A centerpiece as set forth in claim 1, wherein said structure is a rack which comprises a base on which is anchored a center post on which, at different levels above the base plate, lower and upper tier plates are supported, each having a ring of holes therein coaxially directed with respect to said center post, said ring of said upper tier having a larger diameter than said ring of said lower tier, whereby a stem portion of a respective element in said array, when inserted in a hole in said upper ring and a corresponding hole in said lower ring rests on said base plate and is outwardly inclined relative to said base plate.

7. A centerpiece assembly as set forth in claim 6, wherein said base plate and said tier plate are circular and are formed of transparent plastic material.

8. A centerpiece assembly as set forth in claim 6, wherein said rack further comprises third and fourth tier plates supported by said center post at higher levels above said upper tier plate, said third and fourth tier plates each having a ring of holes therein coaxially directed with respect to said center post, whereby a respective stem portion of an element in a second array of said elements inserted in a hole in said fourth ring and a corresponding hole in said third ring rests on said upper tier plate and is outwardly inclined relative to said upper tier plate.

9. A centerpiece assembly as set forth in claim 6, wherein said center post has a circular well at its upper end to receive a stem portion of an element.

10. An element as set forth in claim 1, wherein said pom-pom portion comprises a root which extends through an end cap axially attached to said hollow stem portion, and further including an inner cap secured to said hollow stem portion to separate said root of said pom-pom portion from the candy pellets.

11. A floral element adapted to function as a wand, said element comprising:
 (a) a transparent tubular stem having an end, fillable with colored candy pellets which impart color to the stem;
 (b) a decorative pom-pom positioned distally with repsect to said end to simulate a flower; and
 (c) an openable seal to hold the pellets therein.

12. A container, comprising:
 an elongated hollow member adapted to contain objects, having two ends, a maximum width and an aperture;
 a decorative element being positioned distal to one of said ends of said elongated hollow member and having a maximum width greater that said maximum width of said elongated hollow member;
 a pom-pom-like portion included in said decorative element, said pom-pom-like portion having segments that radiate in substantially three dimensions to substantially fill a central region;
 a system for positioning said pom-pom-like portion distally with respect one of said ends of said elongated hollow member; and
 an openable seal adapted to obscure said aperture and to substantially contain the objects in said elongated hollow member.

13. The container according to claim 12, wherein the objects are edible foodstuffs.

14. The container according to claim 13, wherein the edible foodstuffs are colored candies.

15. The container according to claim 12, wherein the objects are selected from the group consisting of solids and liquids.

16. The container according to claim 12, wherein said pom-pom-like portion has floral characteristics.

17. The container according to claim 12, further comprising a source of fragrance associated with said pom-pom-like portion.

18. A display, comprising:
 a plurality of elements each comprising an elongated hollow member adapted to contain objects, having two ends, a maximum width and an aperture; a decorative element being positioned distally to one of said ends of said elongated hollow member and having a maximum width greater that said maximum width of said elongated hollow member; a pom-pom-like portion included in said decorative element, said pom-pom-like portion having segments that radiate in substantially three dimensions to substantially fill a central region; a system for positioning said pom-pom-like portion distally with respect to one of said ends of said elongated hollow member; and an openable seal adapted to obscure said aperture and to substantially contain the objects in said elongated hollow member; and
 a structure for positioning said plurality of containers in an arrangement.

19. The display according to claim 18, wherein said arrangement is selected from the group consisting of bouquets, fans, frontals, laterals, cascades, conicals, and fountains.

20. The display according to claim 18, wherein said pom-pom-like portion has floral characteristics.

21. The display according to claim 18, wherein the objects are edible foodstuffs.

22. The display according to claim 21, wherein the edible foodstuffs are colored candies.

23. The display according to claim 18, wherein the objects are selected from the group consisting of solids and liquids.

24. The display according to claim 14, further comprising an ornament selected from the group consisting of a balloon, a flower and an artificial flower.

25. The display according to claim 18, further comprising an ornament selected from the group consisting of a flower and an artificial flower.

26. The display according to claim 18, further comprising a shipping enclosure having a bottom, a top, an apparatus for retaining said positioning structure proximate to said bottom of said shipping enclosure, and plastic cling wrap, said plastic cling wrap encircling said containers to hold said containers in fixed relation to said rack.

27. A cosmetic container comprising:
 an hollow member adapted to contain a cosmetic substance, having an end, a maximum width and an aperture;
 a decorative element being positioned distal to said end of said hollow member and having a maximum width greater that said maximum width of said hollow member;
 a puff-like portion included in said decorative element, said puff-like portion being flexible and having a substantially filled central region;
 a system for positioning said puff-like portion distally in relation to said hollow member; and
 a seal adapted to obscure said aperture and to substantially contain the objects in said elongated hollow member.

28. The cosmetic container according to claim 27, wherein said puff-like portion comprises a cosmetic applicator.

29. The cosmetic container according to claim 27, further comprising a structure for supporting said cosmetic container.

* * * * *